United States Patent [19]

Floro et al.

[11] Patent Number: 4,918,589

[45] Date of Patent: Apr. 17, 1990

[54] METHOD AND APPARATUS FOR LINKING PROCESSORS IN A HIERARCHICAL CONTROL SYSTEM

[75] Inventors: William E. Floro, Willoughby; Mark Luboski, Euclid; Timothy J. Murphy, Parma, all of Ohio

[73] Assignee: Allen-Bradley Company, Inc., Milwaukee, Wis.

[21] Appl. No.: 342,637

[22] Filed: Apr. 19, 1989

Related U.S. Application Data

[63] Continuation of Ser. No. 793,589, Oct. 31, 1985, abandoned.

[51] Int. Cl.$^4$ ............................................. G06F 15/16
[52] U.S. Cl. .................................. 364/132; 364/900; 364/921.0; 364/929.4; 364/929.5
[58] Field of Search ... 364/131, 132, 134, 200 MS File, 364/900 MS File

[56] References Cited

U.S. PATENT DOCUMENTS

| | | | |
|---|---|---|---|
| 4,293,924 | 10/1981 | Struger et al. | 364/900 |
| 4,319,338 | 3/1982 | Grudowski et al. | 364/900 |
| 4,404,651 | 9/1983 | Grudowski | 364/900 |
| 4,413,319 | 11/1983 | Schultz et al. | 364/200 |
| 4,442,504 | 4/1984 | Dummermuth et al. | 364/900 |
| 4,477,882 | 10/1984 | Schumacher et al. | 364/900 |
| 4,488,258 | 12/1984 | Strunger et al. | 364/900 |
| 4,521,871 | 6/1985 | Galdun et al. | 364/900 |
| 4,628,437 | 12/1986 | Poschmann et al. | 364/131 |
| 4,648,064 | 3/1987 | Morley | 364/900 |

OTHER PUBLICATIONS

Wilhelm, Jr., Robert E., Programmable Controller Handbook Hayden Book Company, Hasbrouck Heights, NJ 1985, pp. 385–387.
Allen-Bradley Publication 1775-910, Nov. 1981.
Allen-Bradley Publication 1775-909, Jul. 1983.
Product Summary, Automate 30-Automate 40, Reliance Electric Company, Mar. 21, 1985, pp. 14–15.
Allen-Bradley Publication 1771-2.70, May 1985.

*Primary Examiner*—Gareth D. Shaw
*Assistant Examiner*—Jonathan C. Fairbanks
*Attorney, Agent, or Firm*—Quarles & Brady

[57] ABSTRACT

An inter-processor communication module is inserted into a slot of an equipment rack of the type used to connect I/O modules to system processors in a programmable controller. Using two of the inter-processor communication modules in two respective racks, a supervisory processor is connected to two respective local area processors in a distributed control system. The inter-processor communication module has a serial channel controller that connects to the supervisory processor through a serial I/O port and a serial communication channel to communicate blocks of I/O status data. The serial channel controller is coupled to a backplane controller through a common memory and arbitration circuitry to exchange blocks of I/O status data. The backplane controller, which is also a part of the inter-processor communication module, plugs into the backplane of the rack and exchanges blocks of I/O status data with a local area processor. The two controllers also exchange processor status data to coordinate communications which are initiated by the supervisory processor and the local area processor. Methods of transferring I/O status data between the supervisory processor and the local area processors are also disclosed.

24 Claims, 15 Drawing Sheets

METHOD AND APPARATUS FOR LINKING PROCESSORS IN A HIERARCHICAL CONTROL SYSTEM

This application is a continuation, of application Ser. No. 06/793,589, filed Oct. 31, 1985, now abandoned.

Microfiche Appendix B with 4 microfiche containing a total of 208 frames, and Appendix C with 2 microfiche containing a total of 77 frames, are incorporated herein.

BACKGROUND OF THE INVENTION

1. Field of the Invention

The invention relates generally to digital controllers for controlling industrial machines and processes, and more particularly, to programmable controllers.

2. Description of the Prior Art

In the simplest system architecture for a programmable controller, the controller includes a processor module and several I/O modules which are supported in the same equipment rack and electrically connected through a backplane circuit board. The backplane circuit board or simply "backplane", as it is often referred to, is a circuit board with numerous printed circuit paths or traces extending horizontally across the back of the rack to interconnect the modules in the rack.

In a more complex system architecture shown and described in Schultz et al., U.S. Pat. No. 4,413,319, issued November 1, 1983, a programmable controller can also include a stand-alone main processor and a number of "remote" I/O racks strung out along serial communication channels. A scanner module interfaces the main processor to the serial communication channels. The scanner module in the Schultz et al. patent transmitted blocks of I/O status data to adapter I/O modules residing in remote I/O racks. However, the Schultz et al. system was limited to control by a single system processor and one of the adapter modules could not be placed in the same rack with an in-rack processor module.

As technology moves toward greater automation of manufacturing operations, it has become desirable to connect programmable controller systems in a system hierarchy, in which a large-capacity supervisory processor exercises some control over, and monitors, functions for a group of local area programmable controllers, each having its own local area processor. Such a local area programmable controller might take the form of the small programmable controller shown and described in Struger et al., U.S. Pat. No. 4,293,924, issued October 8, 1981, or it might take the form of the multi-rack controller of Schultz et al. mentioned above.

SUMMARY OF THE INVENTION

The invention relates to a method and apparatus for moving I/O status data in bulk between a supervisory processor and a local area processor in a programmable controller system.

The apparatus of the invention is embodied in an inter-processor communication circuit which has a serial I/O port and a serial channel controller for communicating I/O status data as serial data to and from a supervisory processor. The inter-processor communication circuit also includes a second controller that cooperates with the local area processor for transfer of blocks of I/O status data. The serial channel controller and the second controller share access to a common read/write memory through an arbitration circuit to exchange I/O status data traveling between the serial I/O port and the local area processor. The inter-processor communication circuit may be embodied in a module that can be inserted into an equipment rack to transfer I/O status data to and from the local area processor through a rack backplane.

The inter-processor communication module is a double slave module—first, a slave on the serial data channel to the mastership of the supervisory processor, and second, a slave on the backplane to the mastership of the local area processor. The supervisory processor initiates communication over the serial data channel, and the local area processor initiates communication through the backplane.

In responding to communications from both the supervisory processor and the local area processor, discrepancies may arise in the amount of data requested for transfer on the serial data channel and the backplane, respectively. The inter-processor communication module will sense these discrepancies and will automatically take corrective action to avoid errors in communication. When communication errors do occur on the serial data channel or the backplane, they are signaled through a common memory to the processor which is not involved in the erroneous communication. Such errors can be reported to the supervisory processor, as well as being signaled visually at the rack location through light-emitting diodes or the like which are part of the inter-processor communication module.

The invention also relates to a system hierarchy in which a supervisory processor acquires from, and distributes to, each of the local area processors, a copy of its I/O status data, so that the status of the larger system can be monitored at one central location, while allowing distributed and localized control of different parts of the system by the local area processors. The invention also allows one local area processor to signal the supervisory processor upon completion of one manufacturing operation, whereupon the supervisory processor can signal a second local area processor to start a second manufacturing operation.

The invention also relates to communicating processor status information that enables the supervisory processor and the local area processor to monitor the communication activities of each other.

These and other objects and advantages of the invention will become apparent from the following description in which reference is made to the accompanying drawings and to the appendices, which form a part hereof, and in which there is illustrated by way of example, a preferred embodiment of the invention. This example does not necessarily represent the full scope of the invention, however, and reference is made to the claims that follow the description for determining the various embodiments that come within the scope of the invention.

DETAILED DESCRIPTION OF THE PREFERRED EMBODIMENT

A. Programmable Controller System Architecture

Figure 1:
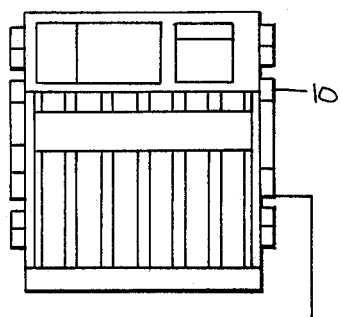
FIG. 1 is a front elevation view of a programmable controller system that uses the inter-processor communication module of the present invention.
Figure 1:
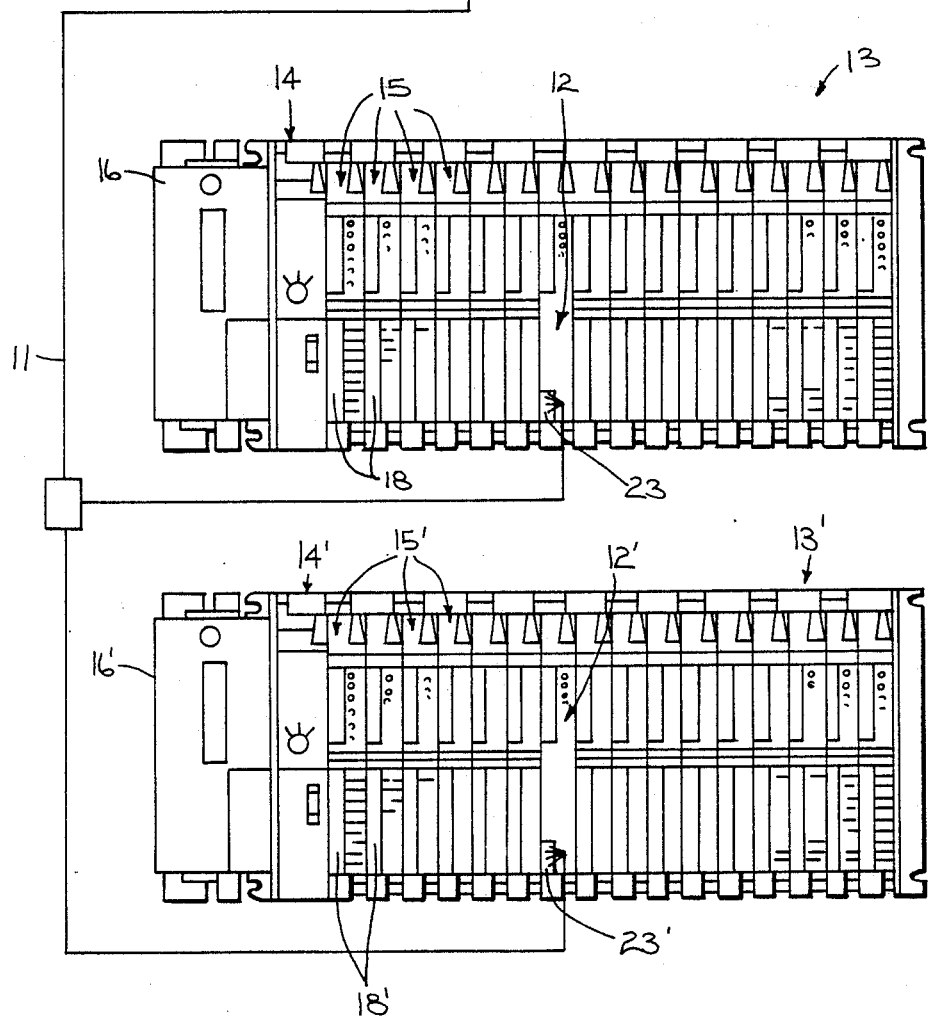

FIG. 1 shows a programmable controller system which utilizes the method and apparatus of the invention. A large-capacity, supervisory processor unit 10 is connected via a serial communication cable and drop lines 11 to a pair of inter-processor communication modules 12 and 12' in respective equipment racks 13 and 13'. Each rack holds a local programmable controller system with an in-rack processor module 14,14', and a group of I/O modules 15,15'. Power supplies 16,16' are mounted on the processor end of each rack 13,13'.

The general functions of the processor modules 14,14' and the I/O modules 15,15' are well known to those skilled in the art. The processor modules 14,14' each execute a control program, sometimes also referred to as a user's application program, because the program is developed in a user program language for one of many possible industrial applications. In executing the program, each processor module 14,14' generates output status data in response to the state of input status data and according to the logic contained in the user control program. At some predetermined time, in this instance between cycles of control program execution, each processor module 14,14' executes an I/O scan in which input status data is read from those of the I/O modules 15,15' that are input modules, and output status data is written to those of the I/O modules 15,15' that are output modules.

Figure 2:
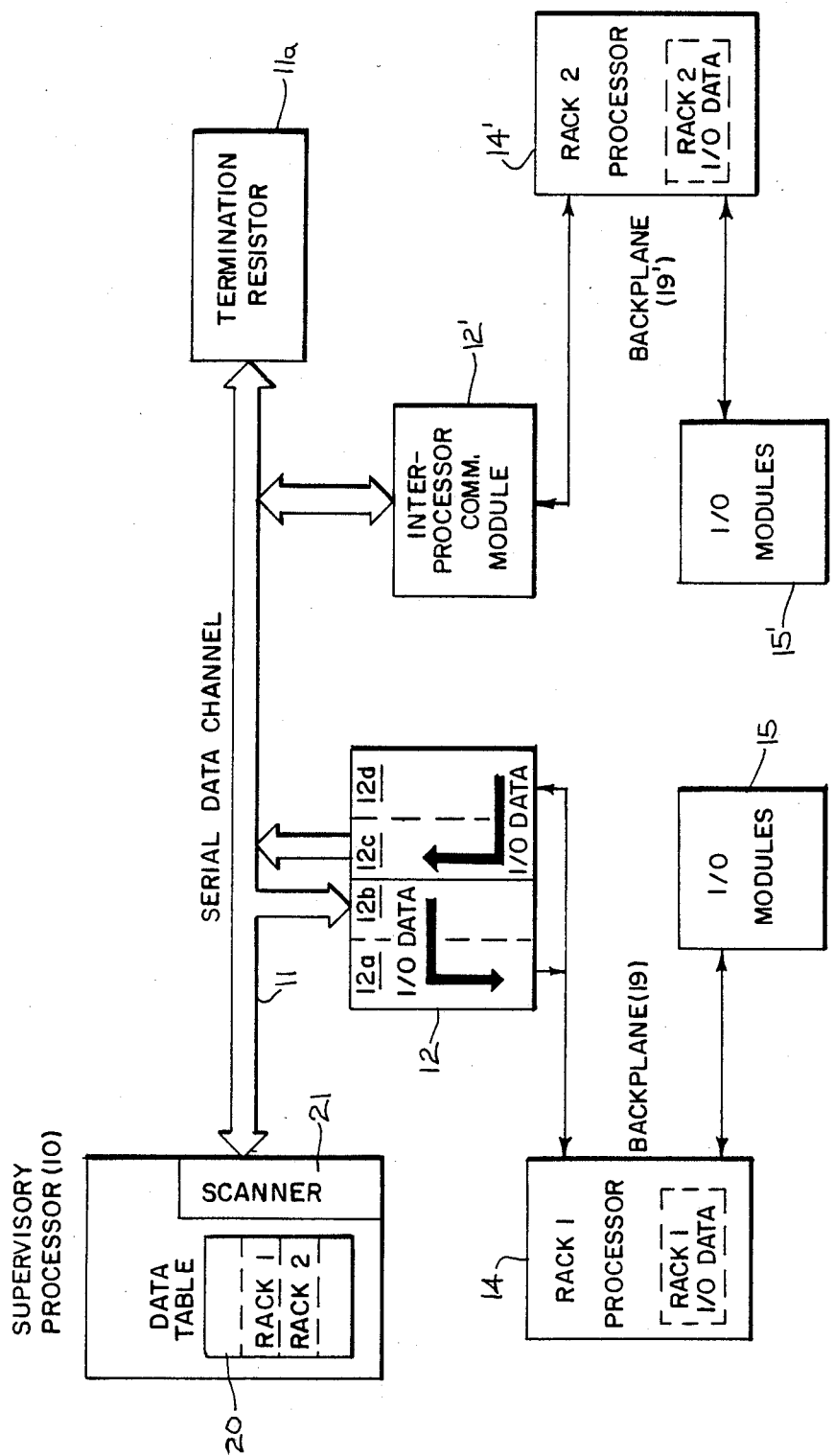
FIG. 2 is a general block diagram of the system of FIG. 1.

The I/O modules 15,15' that are input modules convert AC and DC signals from input devices, such as sensors, limit switches and push buttons, to digital logic-level signals that can be stored as input data. The I/O modules 15,15' that are output modules convert digital logic-level signals to AC and DC signals for operating output devices such as relays and motor contactor switches. The I/O modules 15,15' connect to these input and output devices through swing-arm connectors 18,18', which are seen in FIGS. 1 and 2. These connectors 18,18' connect to the front edges of circuit boards that are housed within covers to form the I/O modules 15,15'.

The processor modules 14,14' and the I/O modules 15,15' are inserted into slots in the equipment racks 13,13' and plug into edge connectors (not shown) mounted on a backplane circuit board, or simply "backplane", which extends across the back side of each rack 13,13' and is shown schematically in FIG. 2. The backplane 19,19' includes a large number of circuit paths or "traces" extending horizontally to inter-connect each processor module 14,14' to each of the I/O modules 15,15' in its respective rack 13,13'. A group of these circuit paths form a byte-wide parallel data bus for carrying bytes of I/O status data back and forth between the processor modules 14,14' and the I/O modules 15,15'. For further information on the local programmable controller system seen in FIG. 1, reference is made to Struger, U.S. Pat. No. 4,250,563, issued Feb. 10, 1981, and Struger et al., U.S. Pat. No. 4,293,924, issued Oct. 6, 1981.

The invention concerns a method and apparatus for distributed control systems in which local controller systems are connected to a supervisory processor 10 that monitors and controls a larger area of the manufacturing plant. As seen in FIG. 2, the supervisory processor unit 10 maintains a data table 20 with a copy of the I/O status data for each of the rack processors 14,14'. The supervisory processor 10 executes an I/O scan sequence to transmit updated output status data to, and to receive updated input status data from, the local controller systems. The supervisory processor 10 also sends information about its own status, and receives information about the status of the rack processors 14,14'.

The supervisory processor unit 10 includes a scanner circuit 21 seen in FIG. 2 and described in U.S. Pat. No. 4,442,504 issued April 10, 1984. This scanner circuit 21 was originally designed to connect through a serial channel to I/O interface adapter modules in remote I/O racks. These adapter modules would occupy the slots occupied by the in-rack processor modules 14,14' in FIG. 1. Such adapter modules performed the transfer of I/O status data to the I/O modules across the backplane which is here performed by the processor modules 14,14', but the adapter modules could not execute a user control program to update output status data in response to updated input status data. Such modules were therefore devices for enlarging the size of a single-processor system, and did not allow connection of system processors in a system hierarchy for distributed control.

The advantage of distributed control is that—with the control of machinery operating in a real time environment—the response to new input data will be faster if the new input data does not have to be transmitted over long distances with new output status data being returned over the same long distances. In the two-tiered controller of FIG. 1, those tasks which requie faster response can be processed locally, while those tasks which allow longer response times can be processed by the supervisory processor 10. This overcomes the disadvantage of centralized control, wherein all of the collected data is competing for the processing time of a single processor.

To retain the local processors 14,14' in their usual slots of the equipment racks 13,13' as seen in FIG. 1, the inter-processor communication modules 12,12' have been inserted into slots of the equipment racks 13,13' that are wired on the backplane 19,19' to receive I/O modules 15,15'. As seen in FIG. 2, the scanner portion of the supervisory processor unit 10 is connected to the inter-processor communication modules 12,12' through a serial data channel embodiment in the communication cable and drop lines 11 seen earlier. The serial data channel is terminated by a termination resistor 11a. The modules 12,12' also communicate with the processors 14,14' in their respective racks 13,13' through the backplanes 19,19' of the racks 13,13'. The processors 14,14' then communicate with the I/O modules 15,15' in their respective racks 13,13', through the respective backplanes 19,19'.

Although the inter-processor communication modules 12,12' in FIG. 2 are communicating downstream to the local area processors 14,14' in the overall controller system, their communication with the local area processors 14,14' is controlled by the processors 14,14', which initiate communication with the modules 12,12' during the exchange of I/O status data with the I/O modules 15,15'. Thus, from a communication view point the inter-processor communication modules 12,12' are seen as a type of I/O module by the local processors 14,14'. To be more specific—the inter-processor communication modules 12,12' appear to the local processors 14,14' as block transfer I/O modules of a type described in Struger et al., U.S. Pat. No. 4,293,924, issued Oct. 6, 1981. In the controller system described there, the block transfer module collected bytes of data that were converted from analog input signals, and transferred the data in a block to a local processor—the block transfer module was a link between the local processor and the I/O devices. It increased the "density" of I/O status data that could be handled by a single I/O module.

Figure 3:
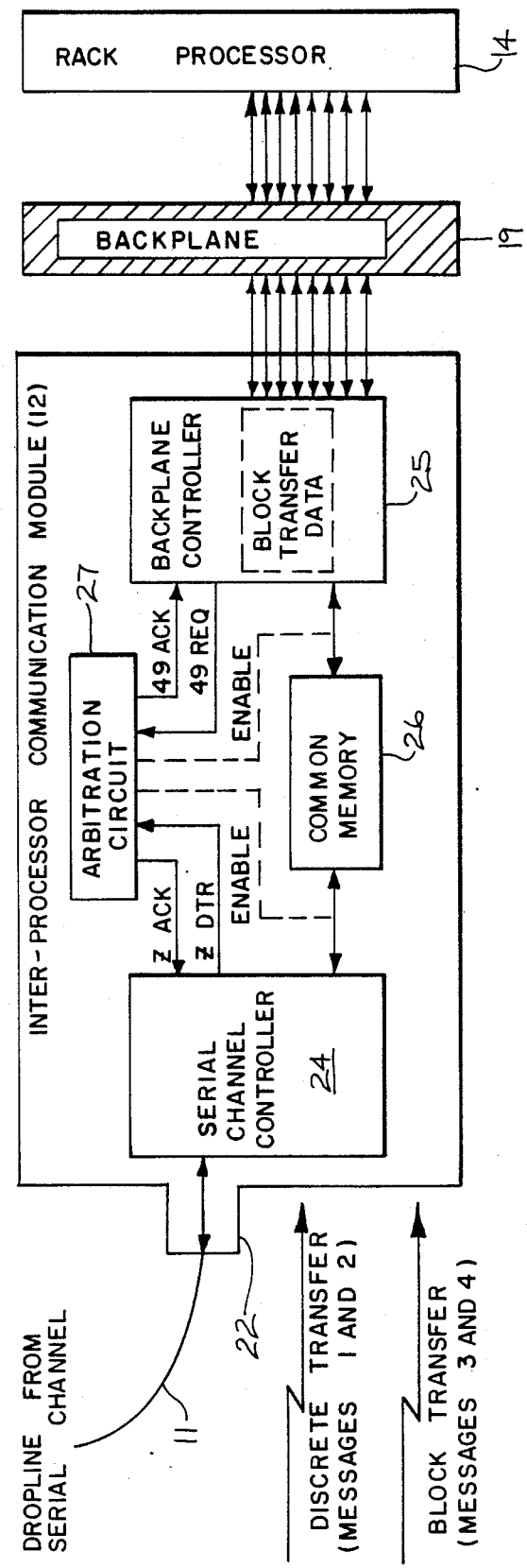
FIG. 3 is a general block diagram of the inter-processor communication module of FIGS. 1 and 2.

FIG. 3 shows the primary elements of one of the inter-processor communication modules 12, which is identical to the module 12'. The module has a serial I/O port 22 that connects to the serial data channel 21 running from the supervisory processor unit 10. The serial I/O port 22 is physically embodied in a connector with a set of three terminals 23 seen in FIG. 1. A serial channel controller 24 is coupled to the serial I/O port 22 to control transmission and reception of serial data traveling back and forth through the channel 11 from the supervisory processor unit 10. A backplane controller 25 connects to the rack processor 14 through the backplane 19 when the module 12 is inserted into a slot in the equipment rack 13. This controller 25 co-operates with the local processor 14 in its rack 13 to couple a multiword block of I/O status data through the backplane 19. To pass the I/O status data from one of the controllers to the other, the controllers 24,25 are coupled to a common read/write memory 26 and to an arbitration circuit 27. The arbitration circuit 27 allows the controllers 24,25 to alternate access to the memory 26 and prevents simultaneous access to the memory 26.

After power is applied to the local controller system, the backplane controller 25 gains access to the common memory 26, by virtue of a 49 REQ line seen in FIG. 3. A signal on this line will cause the arbitration circuit 27 to return an active signal on the 49 ACK line, which is signal that the common memory 26 is available for the reading and writing of data by the backplane controller 25. Periodically, the backplane controller 25 will release its control of the common memory 26 by removing the active signal from the 49 REQ line. If the serial channel controller 24 then generates several control signals, to produce the signal referred to as Z DTR in FIG. 3, the arbitration circuit 27 will return an active signal on a Z ACK line, and the common memory 26 will be available to the serial channel controller 24 for reading and writing data.

B. Communication Modes for I/O Status Data Transfer

As illustrated in FIG. 3, the primary function of the inter-processor communication module 12 is to couple I/O status data in bulk in both directions between the serial data channel and the backplane. Whereas, I/O status data is typically associated as one or two bytes with an individual I/O module, the object here is to transfer as many as 128 bytes of I/O status data as a block of I/O status data between the serial data channel 11 and the backplane 19. The block of data is formatted on each side of the inter-processor communication module 12 by the serial channel controller 24 and the backplane controller 25 to accomplish the corresponding serial or parallel data communication.

The inter-processor communication module 12 operates in one of two modes of operation, according to the setting of a DIP switch (not shown). The first mode is referred to as "discrete transfer" and the second mode is referred to as the "block transfer" mode, and these are represented by two vectors shown in FIG. 3. To explain the difference between these, reference shall be made to FIGS. 4 and 5.

Figure 4:
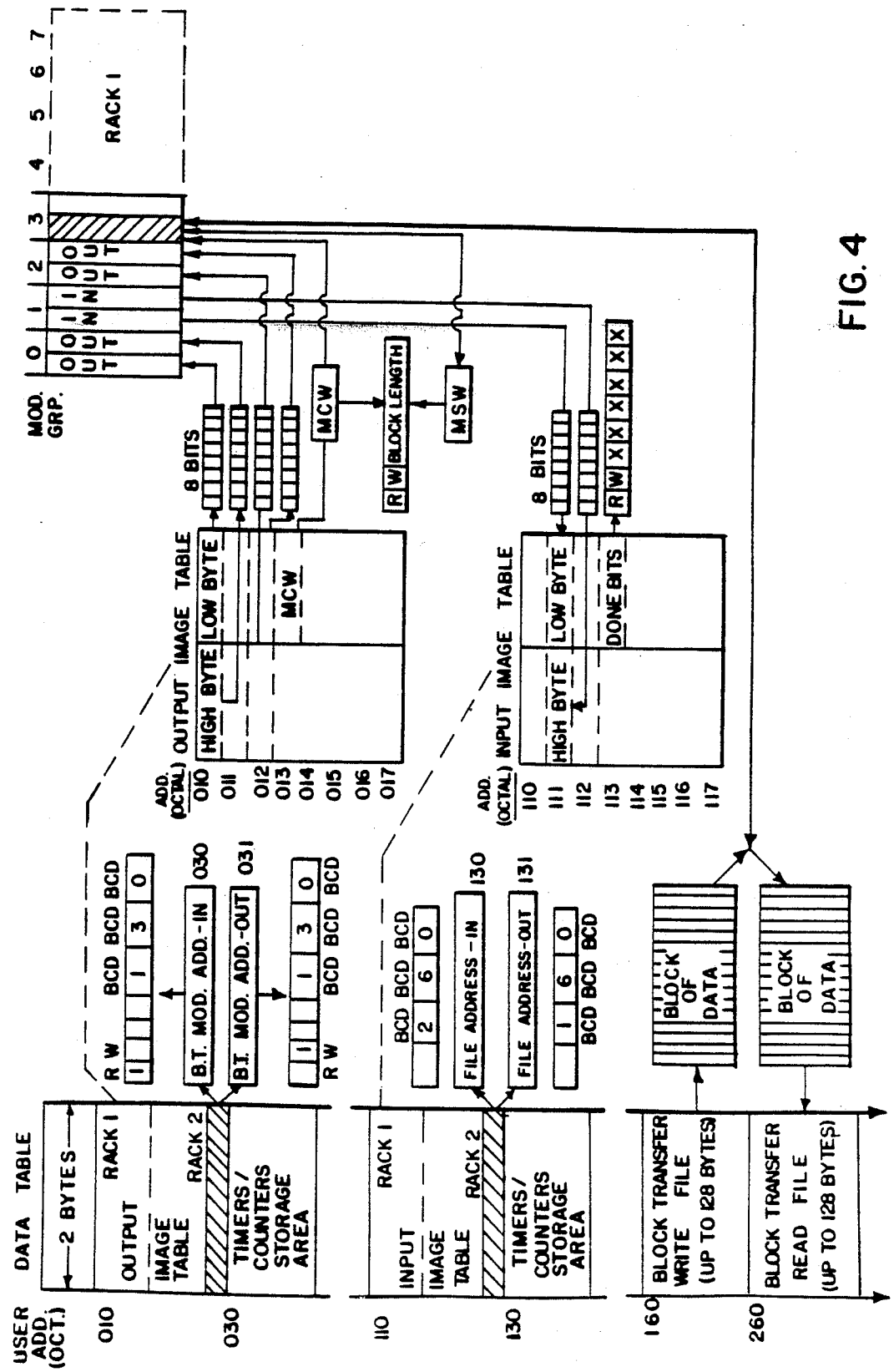
FIG. 4 is a map relating a data table of a programmable controller processor to an I/O rack of the type seen in FIG. 1.

FIG. 4 shows the general organization of a data table of the type stored by the supervisory processor 10 and by the in-rack processors 14 and 14'. To simplify the explanation, the diagram in FIG. 4 has been drawn as if the supervisory processor 10 were connected directly through the backplane of the I/O rack 13, rather than through the inter-processor communication module 12. The I/O status data for each of the two I/O racks 13 and 13' is divided into output status data, which is stored in an image table beginning at 010 (octal), and input status data, which is stored in an image table beginning at 110 (octal). (The octal numbering system is used in user application programs to identify input and output addresses.)

As seen in the expansion of these two image tables, each addressable location in memory stores two bytes of I/O status data: a low byte and a high byte. During the input/output scan operation, output data is transmitted to output modules, which are organized in paris or "module groups" for addressing purposes. Each full rack includes eight module groups numbered from 0-7 (octal). Assuming, for example, two output modules are located in Module Group 0 of Rack 1, then a low byte will be transmitted to the first output module and a high byte will be transmitted to the second output module, assuming they are of byte-sized capacity. To continue the example, assuming that two input modules are located in Module Group 1 of Rack 1, a low byte of input status data will be read from the first input module, and a high byte of input status data will be read from the second input module, and these two bytes will be received and stored in corresponding locations in the input image table. A place is reserved in both the output image table and the input image table for each physical I/O location so that either an input module or an output module can be placed in any location in the I/O rack 13.

Discrete transfer of I/O status data is a type of memory-mapped input/output addressing in which the individual bytes or words of I/O status data are related according to their sequence to a corresponding group of I/O modules. At some point along the path of communication, it is normally contemplated that these be coupled to I/O modules in a hardware-implemented signaling sequence, which is initiated by executing a set of instructions for a microprocessor referred to as an I/O scan sequence. In executing this sequence the I/O status data is transferred without any accompanying address or control information.

FIG. 4 also illustrates a "block transfer" to a bidirectional block transfer I/O module in the low byte position in Module Group 3 in Rack 1. The block transfer is controlled by a more elaborate sequence of microprocessor instructions and by parameters which are supplied by the user in the user-language application program. The first of these is a module control word (MCW) which is stored in the output image table location 013 (low), so that it will be transmitted to the block transfer module (shaded area in Rack 1 in FIG. 4). This word is actually a "byte" with read and write flag bits as the high order bits "7" and "6", followed by a "block length" number of six bits, as shown diagrammatically in FIG. 4. The block length number indicates how many two-byte words of I/O status data will be transmitted as a block to the single I/O address occupied by the block transfer module.

A second parameter that is provided by the user for execution by the block transfer programming is a data address, where a third parameter provided by the user—the I/O address of the block transfer module—is stored. The data address is preferably the first location in a timers and counters area, which is searched by the block transfer program to find the I/O address. If the block transfer module is bidirectional, one address is stored for input and one address is stored for output, as shown at locations 030 and 031 (octal) in FIG. 4. The two-byte address word format includes "read" and "write" direction flags and three binary-coded decimal numbers specifying the I/O address.

A fourth parameter that is provided by the user for execution by the block transfer programming is a file address where the block of I/O status data can be stored, as it is too large to be stored in the image table. This address is stored at an address in a second timers and counters area that will be automatically searched in response to the block transfer program and the user-provided data address. If the block transfer module is bidirectional, one address is stored for input and one address is stored for output, as shown at locations 130 and 131 (octal) in FIG. 4. The address word format includes three binary-coded decimal numbers specifying the file address. Here the write file or output file address is 160 (octal) and the read file or input file address is 260 (octal).

The last parameters to be discussed in relation to FIG. 4 are the "done bits" which are stored in the input image location corresponding to the I/O address of the block transfer module. These are the "R" (read done) and "W" (write done) bits. The "X" bits are irrelevant.

When viewed in the context of local programmable controllers, the "block transfer" mode requires more program control than distributing discrete bytes of I/O status data through an I/O scan sequence. The block transfer mode does, however, permit larger groups of data to be handled in bulk.

Referring again to FIG. 3, the transfer of I/O status data in the discrete and block transfer modes occurs, not in a local system as assumed for FIG. 4, but in a remote system where I/O status data is communicated long distance over a serial data link. Therefore, the handling of groups of discrete data and block transfer data for serial transmission will be considered next.

C. Communication on the Serial Data Channel

Figure 5:
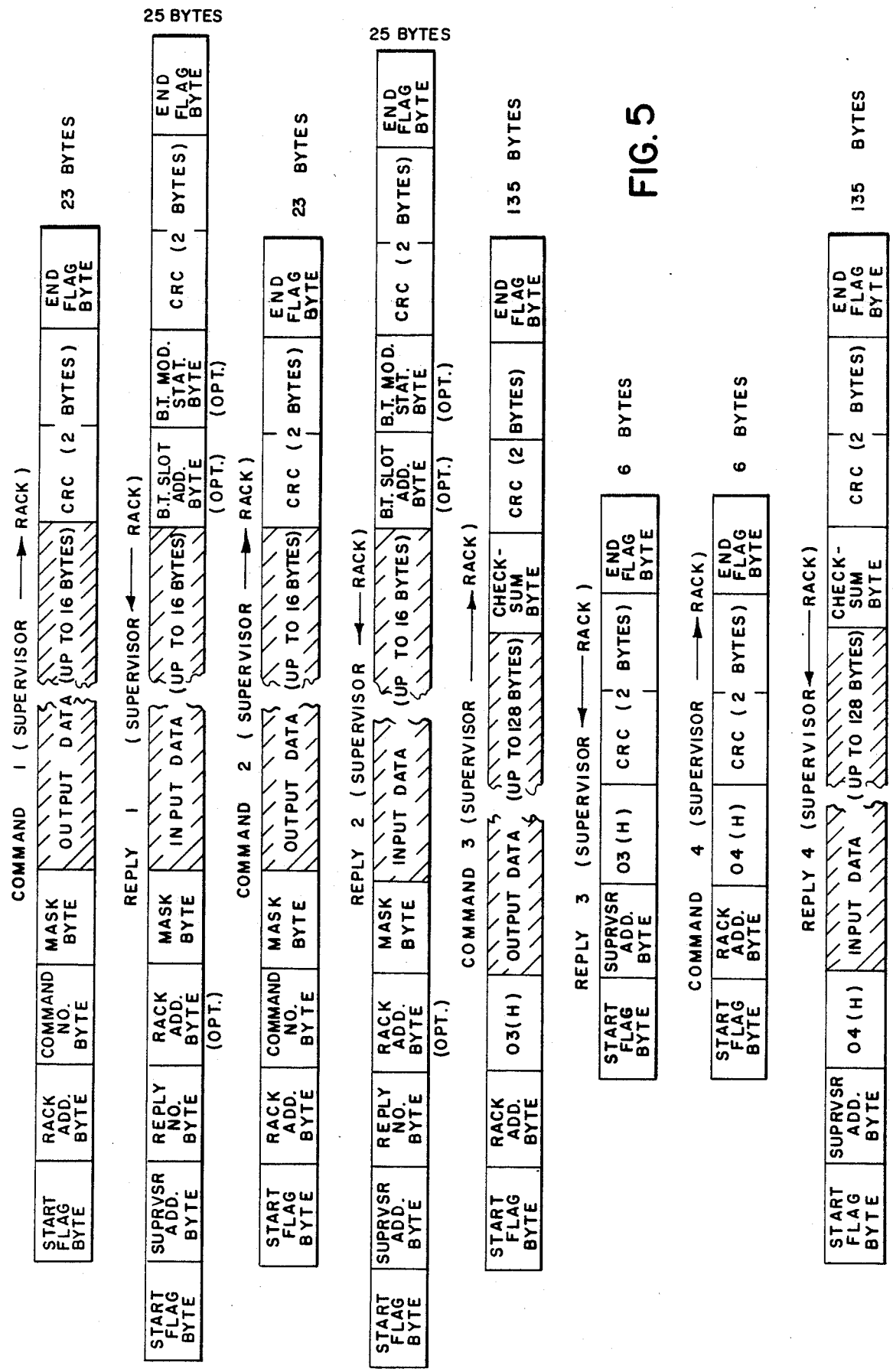
FIG. 5 is a map of a series of messages which are transmitted between the supervisory processor and the inter-processor communication module.

FIG. 5 illustrates the messages used for communication on the serial data channel 11. These are consistent with the protocol disclosed for remote transfer of I/O status data in Schultz et al., U.S. Pat. No. 4,413,319, cited earlier herein. Each message constitutes a string of data referred to more generally as a "frame". Generally, the frame for all eight of the messages is organized as follows:

```
START FLAG/SYSTEM
  ADDRESS/COMMAND OR REPLY
  NO./MASK/INPUT-OUTPUT STATUS
  DATA/B.T.STATUS/CRC/END FLAG
```

The start and end flags are segments with values that the transmitting and receiving circuitry will recognize as the beginning and end of a frame, respectively. The system address is the programmable controller system address of an I/O rack, for example. The scanner portion 21 of the supervisory processor 10 in FIG. 2 also has a system supervisor address.

The system address is followed by a segment that includes the identifying number for the command or reply message. There are four different "command" messages identified in FIG. 5 as Commands 1-4 and four different "reply" messages identified in FIG. 5 as Replies 1-4. The Command 2 message, for example, includes a binary-coded "2" in the command number segment. The command or reply number segment is followed by a "mask" segment, which is a coded identification of the input or output status data that follows it, when sixteen bytes of input or output status data is related to individual I/O modules in an I/O rack. Alternatively, the input or output status data can be sent in a larger block, up to 128 bytes, to a single I/O address, and this is referred to as "block transfer".

To execute a block transfer of I/O status data, special information is transmitted in some of the messages. This includes a block transfer module control byte (referred to as the first MSW in U.S. Pat. No. 4,413,319). This is a data byte with read and write flags in bits "7" and "6" and with a block size number in bits "0" through "5". It is transmitted as part of the output data in both the Command 1 and the Command 2 messages. A block transfer module status byte (referred to as the second MSW in U.S. Pat. No. 4,413,319) is returned in one of the reply messages in response to the module control word, however, the module status byte is assigned a separate location in the frame following any I/O status data that is returned. Also, when a block of I/O status data is transmitted, it is sent with its own checksum. The message frame contains a CRC (cyclic redundancy code) segment to detect communication errors in other segments, and the checksum is an additional step to maintain the integrity of a block of data as it travels from its source to its destination.

The message segments in the present example are organized in terms of one or more "bytes" having eight individual bits of data associated together. These bytes may in some instances be referred to as "words", which is a more general term for describing data strings of four bits, eight bits, sixteen bits, or even thirty-two bits in length. Although the description herein is largely in terms of bytes, it should be apparent that the invention can be used with data words of other sizes.

Referring again to FIG. 2, when one of the messages of FIG. 5 is transmitted by the supervisory processor 10, it travels through the serial data channel 11 to all of the racks hooked up to it, but only the rack that has an address matching the address in the command message will respond with a reply message. Communication is carried out in a half-duplex mode, meaning that first a message is sent in one direction (supervisor to rack) through the serial data channel, and then a message is returned in the opposite direction (rack to supervisor). At any particular time the channel supports a single message traveling in a single direction.

The Command 1 message is a polling message which seeks replies from the I/O racks in the system to provide the scanner 21 with initial information on the number, size and distribution of I/O racks along the serial data channel. When the Command 1 message is sent, the outputs connected to the receiving I/O rack are held reset, so the output status data is not communicated to its normal destination. The Command 1 message can prepare for an output of block transfer data by signaling a block transfer "not busy" bit as part of its command identification byte, and by sending a block transfer module control byte as part of its output data. As seen in FIG. 5, a Command 1 message may include up to 23 bytes of data.

Assuming the Command 1 message is received by the interprocessor communication module 12 of FIG. 3 with a matching address, its serial channel controller 24 will respond with a Reply 1 message as seen in FIG. 5. After its start flag byte, its supervisor address byte, and its reply number byte, the rack address of the inter-processor communication module 12 is inserted, as a group of data used by the supervisory processor 10 of this example, but not by all other system processors which can also be employed as supervisors. This byte is followed by the mask byte and the input data from low-density, eight-bit I/O modules in the rack. If the inter-processor communication module 12 is requesting a block transfer of I/O status data, a B.T. slot address and the B.T. module status byte follow the input data for the low-density I/O modules. With a CRC segment of two bytes and an end flag byte the Reply 1 message may contain up to 25 bytes of information.

As seen in FIG. 5 the Command 2 message and the Reply 2 message have the same organization as the Command 1 message and the Reply 1 message, respectively. The Command 2 message is sent after the scanner 21 and the inter-processor communication module 12 have initiated communication, so the outputs are no longer held reset, and the output data will be used in controlling output devices. The sequence of sending the Command 1 message, receiving the Reply 1 message, and then sending the Command 2 message means that input data from a rack is received by the supervisory processor 10 before output data is sent back to the rack. The Command 2 message and the Reply 2 message are then transmitted back and forth to couple I/O status data of the type that is exchanged between a processor and I/O modules in the same rack during an I/O scan sequence, which is executed between cycles of a user application program. These messages achieve the transfer of "discrete" I/O status data.

A request for executing a block transfer of I/O status data is returned by the inter-processor communication module 12 in either the Reply 1 message or the Reply 2 message, according to whether the request occurs during startup of communication or after communication has been established. The block transfer request is returned as a bit in the reply byte of the respective messages. The B.T. module status byte that is returned determineds whether the block transfer is a write operation (output from the supervisory processor 10) or a read operation (input to the supervisory processor 10).

The Command 3 message is transmitted by the supervisory processor 10 to write a block of I/O status data to the inter-processor communication module 12. Up to 128 bytes of I/O status data and a checksum follow the command byte, which has the value 03 (hexadecimal) as seen in FIG. 5. The complete message or frame may contain up to 135 bytes. The inter-processor communication module 12 returns a Reply 3 message in response to the Command 3 message to confirm the success of the transfer. The Reply 3 message does not contain any I/O status data, but only the start and end flag bytes, the supervisor address byte, the reply byte and a two-byte CRC for a total of six bytes.

The read transfer is handled in obverse fashion. A Command 4 message of six bytes similar to the Reply 3 message is sent from the supervisory processor 10 to the inter-processor communication module 12. This message triggers a response of a Reply 4 message of up to 135 bytes, with a format similar to the Command 3 message, except for the message identification and the direction of transmission. The Reply 4 message includes up to 128 bytes of I/O status data and an accompanying checksum that are read by the supervisory processor 10.

To summarize, I/O status data is transferred in the "discrete" mode through the Command 1 and Command 2 messages and the Reply 1 and Reply 2 messages. In the "block transfer" mode, the Command 1 and Command 2 messages and the Reply 1 and Reply 2 messages set up the I/O data transfer, which is then accomplished by either the Command 3-Reply 3 message pair or the Command 4-Reply 4 message pair, according to the direction of transfer.

Whereas, there are two types of transfer over the serial data channel corresponding to the "discrete" and "block transfer" modes of I/O communication, the data transfer on the backplane is formatted the same for both communication modes and is a block-type transfer of parallel data. The transfer of "discrete" I/O status data is therefore characterized by the association of individual data words with corresponding I/O modules or I/O slot addresses, where a slot address is associated with high byte or low byte portion of a Module Group. And, the "block transfer" of I/O status data is characterized by the transfer of a plurality—usually a large plurality—of words of I/O status data associated with an individual I/O module or I/O slot address.

D. Special Control Functions of the Inter-processor Communication Module

As a modification to the methods of transfer discussed above, the serial channel controller 24 of FIG. 3 inserts the supervisory processor status byte (SPRSTAT) as the second byte of the I/O status data and inserts zeroes as the first byte of the I/O status data being sent to the backplane controller 25, and eventually, to the local area processor. The user of the system is therefore instructed to reserve these bytes and use only the remaining data bytes for I/O status data. The byte with zeroes is reserved for a second byte of supervisor status information. In analogous fashion, the backplane controller 25 inserts the local area processor status byte (BPSTAT) as the second byte of the I/O status data and inserts zeroes as the first byte of the I/O status data going back to the serial channel controller 24, and eventually, to the supervisory processor 10. Thus, the first two bytes in the I/O data string from the local area processor are reserved for this purpose. In this way the serial channel controller 24 learns of certain problems in communication on the backplane and the backplane controller 25 learns of certain problems in communication over the serial data link.

The supervisory processor status byte (SPRSTAT) contains bits signaling:

(1) insufficient data from the supervisory processor 10 to meet the request of the local area processor;

(2) excess data from the supervisory processor 10 in response to the request of the local area processor;

(3) no communication from the inter-processor communication module 12 to the supervisory processor 10; and (4) data is not available from supervisory processor 10 to transfer to the backplane controller 25.

The local area processor status byte (BPSTAT) contains bits signalling:

(1) insufficient data from the local area processor to meet the request of the supervisory processor 10;

(2) excess data from the local area processor in response to the request from the supervisory processor 10;

(3) backplane resets, errors and faults;

(4) data is not available from the backplane controller 25; and (5) the block transfer data being transferred to the serial channel controller 24 has previously been reported and is therefore "old data".

If the backplane controller 25 receives the SPRSTAT byte (also referred to as the STATS byte) and detects insufficient data from the supervisory processor 10 to meet a request for data by a local area processor, it will add bytes of zeroes to the available data to provide the number of bytes requested by the local area processor. If the backplane controller 25 receives the STATS byte and detects that data is available in excess of the number of bytes requested by the local area processor for transfer, the backplane controller 25 will truncate the data block and transfer only the requested number of bytes.

Similarly, in the other direction, if the serial channel controller 24 receives the BPSTAT byte (also referred to as the RPRSTAT byte) and detects insufficient data from the local area processor to meet the request of the supervisory processor 10, it will add bytes of zeroes to fill out the block. If excess data is available, the block of data going to the supervisory processor 10 will be truncated by the serial channel controller 24.

Another feature of the inter-processor communication module 12 is that I/O status data sent upstream to the supervisory processor 10 from the in-rack system processor 14 can be protected from overwriting by a second group of I/O status data received from the backplane until the first group of I/O status data can be sent to the supervisory processor 10. This is the "protected update" feature. This feature is applicable when the "block transfer" mode of communication is used for communication over the serial data lines.

E. Details of the Circuitry

Figure 6:
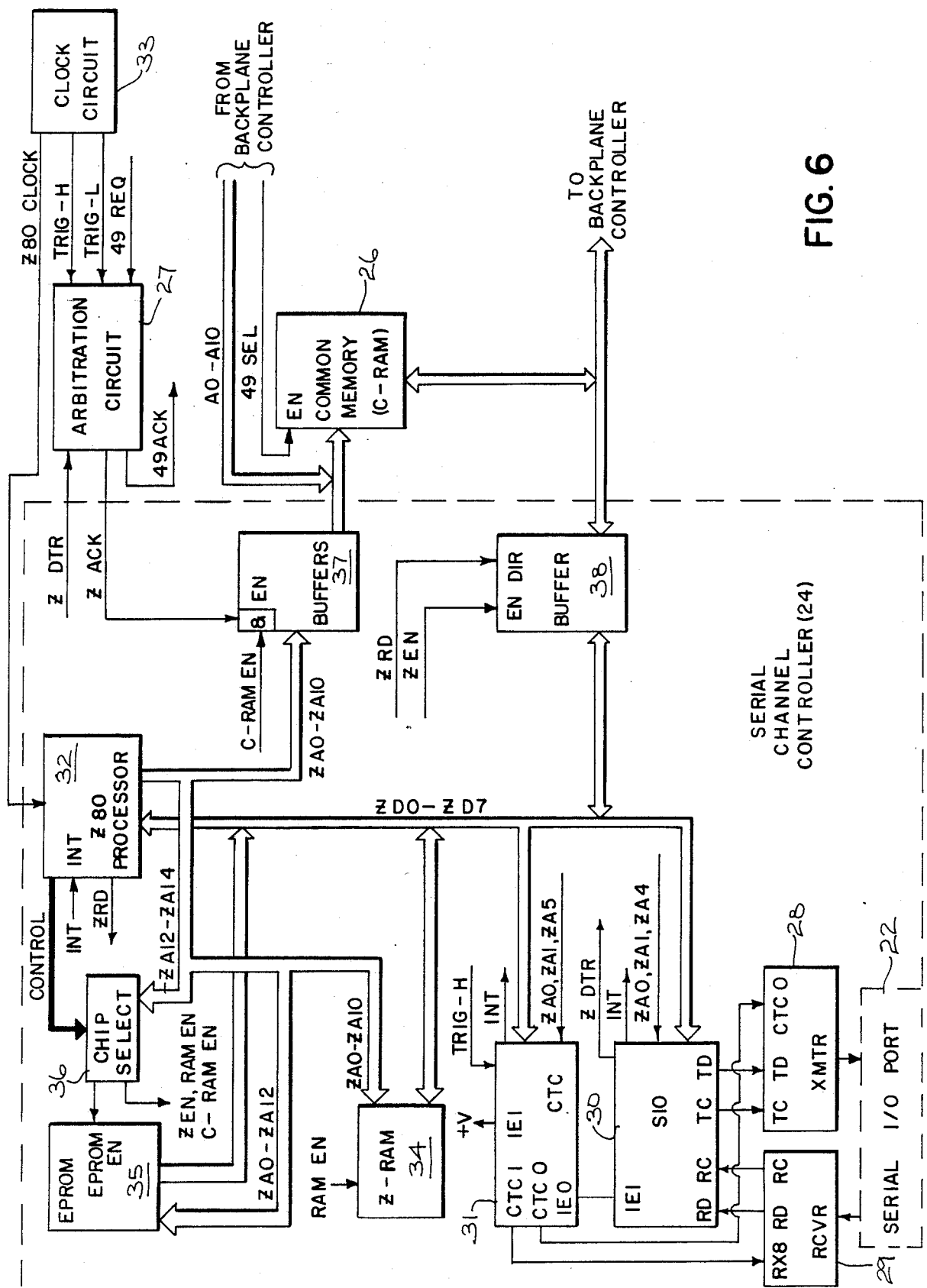
FIG. 6 is a block diagram of a serial channel controller portion of the inter-processor communication module of FIG. 3.
Figure 7:
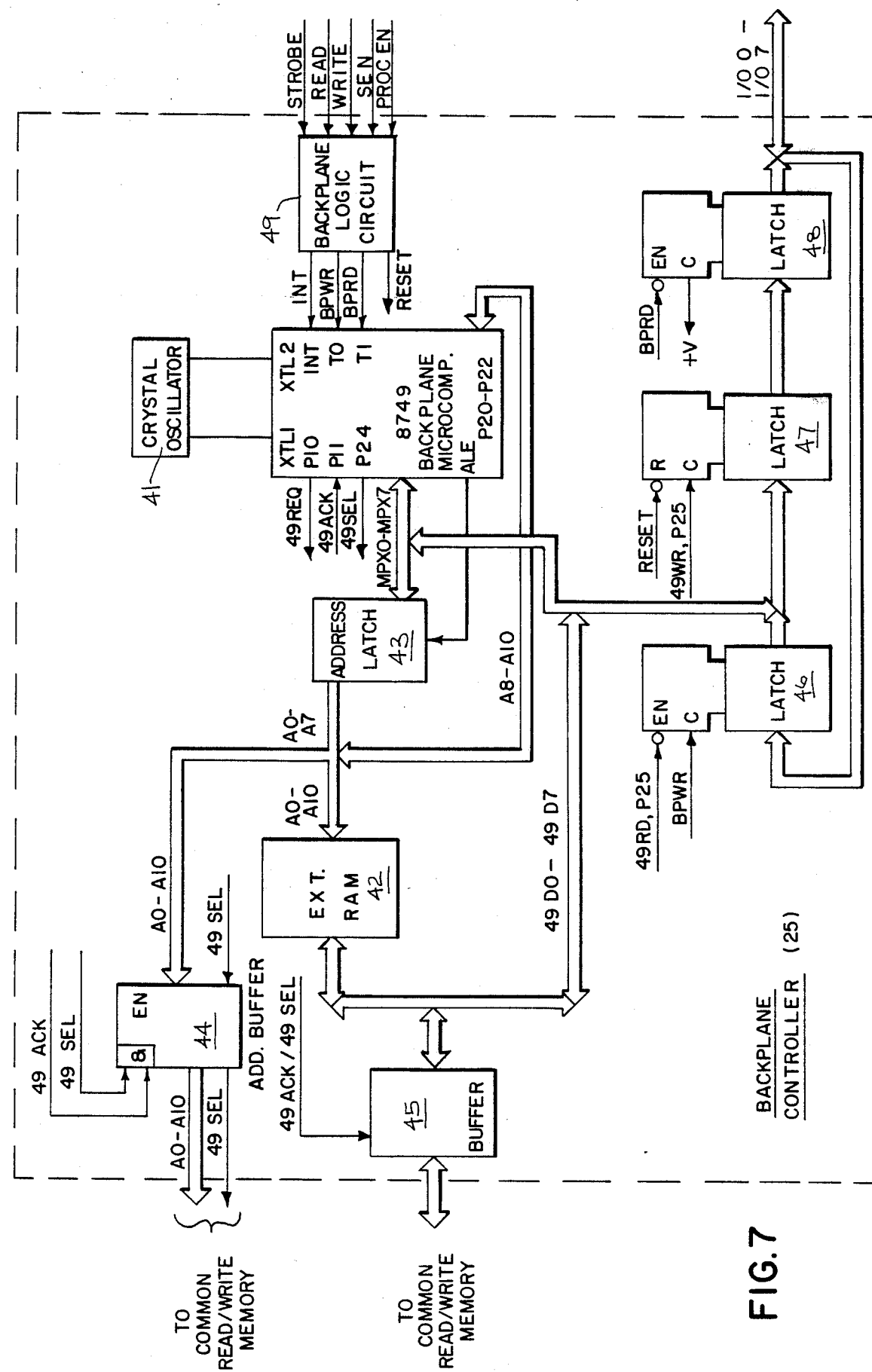
FIG. 7 is a block diagram of a backplane controller portion of the inter-processor communication module of FIG. 3.

FIGS. 6 and 7 show the details of the serial channel controller 24 and the backplane controller 25. The common memory 26 and the arbitration circuit 27 in FIG. 6 are connected by address, control and data lines to the backplane controller 25 of FIG. 7.

Referring first to FIG. 6, the serial I/O port 22 connects to three outputs on a transmitter (XMTR) circuit 28 and to three inputs on a receiver (RCVR) circuit 29. The XMTR circuit 28 is connected to receive transmit clock (TC) signals and transmit data (TD) signals from a serial input-output (SIO) circuit 30, which in the preferred embodiment is a Z80-SIO circuit available from Zilog, Inc., and other known sources. These signals are further timed with reference to a CTC O clock frequency received from a counter/timer (CTC) circuit 31, which in the preferred embodiment is a Z80-CTC circuit available from Zilog, Inc., and other known sources. The XMTR circuit 28 encodes serial data as Manchester-coded signals, which are then transmitted through the serial I/O port 22.

The RCVR circuit 29 is connected to pass the Manchester-coded signals to the SIO circuit 30 on the receive data (RD) line and to recover the "receive clock" (RC) signals from the data stream. It then passes the RC clock signals to the SIO circuit 30 to assist in decoding data in the SIO circuit 30. An RX8 clock frequency is generated by the CTC circuit 31 and is used by the RCVR circuit 29 to assist in recovering the RC clock signals from the Manchester-coded transmission signals.

The SIO circuit 30 is a two-channel, programmable peripheral circuit. Its primary function is to convert between serial data and parallel data. It also handles data according to various serial data protocols. The SIO circuit 30 is connected to a microelectronic CPU or microprocessor 32 through eight lines (ZD0–ZD7) of a Z80 data bus to receive control information or data to be sent to it from the microprocessor 32, or to transmit status information or data to the microprocessor 32. Control/status signals, channel select and chip select signals are transmitted to the SIO circuit 30 through lines ZA0, ZA1 and ZA4 of a processor address bus.

The CTC circuit 31 is a four-channel component for providing timing and counting functions from internal timers and counters that can be programmed via control information received from the microprocessor 32, which in the preferred embodiment is the Z80-CPU available from Zilog, Inc., or other known sources. The control information or data is sent to the CTC circuit 31 from the microprocessor 32 through the eight lines (ZD0–ZD7) of the Z80 data bus. Two binary-coded channel select signals are sent to the CTC circuit 31 on lines ZA0–ZA1 of the processor address bus, while a chip select signal is coupled on line ZA5. The CTC circuit 31 is incremented either by a trigger signal (TRIG-H) or the Z80 clock signal, both of which are transmitted by a clock circuit 33. The trigger signal (TRIG-H) is also used for synchronization in the arbitration circuit 27.

The SIO and CTC circuits 30 and 31 are connected in an interrupt priority chain through interrupt enable inputs and outputs. The interrupt enable input (IEI) on the CTC circuit 31 is pulled high, while the interrupt enable output (IEO) is connected to IEI input on the SIO circuit 30. This gives the CTC circuit 31 priority over the SIO circuit 30 in generating interrupts to the microprocessor 32. Interrupt request (INT) outputs on both the SIO and CTC circuits 30 and 31 are connected in common to an interrupt (INT) input on the microprocessor 32. The microprocessor 32 reads a byte of information sent to it over the Z80 data bus to distinguish which of these devices is sending an interrupt signal and the nature of the interrupt signal.

Figure 10:
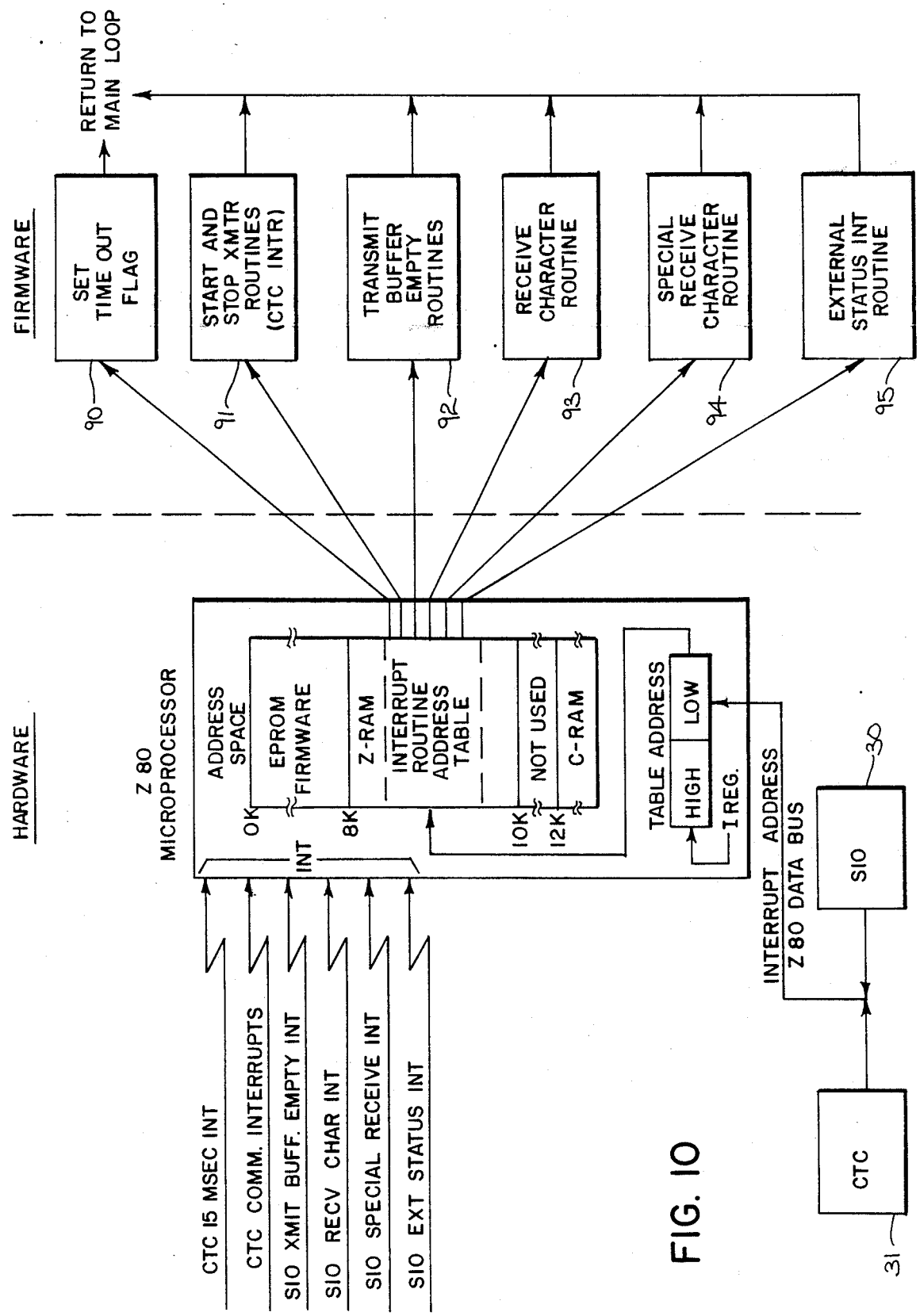
FIG. 10 is a hardware-firmware schematic for the serial channel controller of FIG. 6.

Referring to FIG. 10, it will be seen that six types of interrupt signals are received from the SIO and CTC circuits 30 and 31. The CTC circuit 31 generates an interrupt signal each 15 milliseconds, as well as a group of communication interrupts when communication is taking place over the serial channel. The SIO circuit 30 generates four different types of interrupts, including XMIT BUFFER EMPTY interrupts during serial data transmission, and three other types of interrupts, the RECEIVE CHARACTER interrupt, the SPECIAL RECEIVE interrupt and an EXTERNAL STATUS interrupt during reception of serial data.

When an interrupt signal is generated at the INT input of the microprocessor 32, a byte of information is communicated over the Z80 data bus, where it becomes the lower portion of a sixteen-bit interrupt table address pointer. The upper portion is stored in an I register during start up operations. Using this pointer, the Z80 microprocessor 32 addresses a table in memory where the starting addresses for various routines of processor instructions are stored. It selects one of these starting addresses to obtain the next instruction to be executed. The subsequent instructions in the routine are then executed to carry out the function of the interrupt. At the end of this execution, the Z80 microprocessor 32 returns to a main loop portion of its overall program. It should be noted that, in response to a CTC 15-millisecond timer interrupt, only a time out flag bit is set, and the time out function is performed later in response to detection of this bit. The use of the above-described interrupts allows the peripheral circuits to signal back to the Z80 microprocessor 32 and to provide two-way communication between the supervisory processor 10 and the serial channel controller 24.

This has been by way of a general introduction to these sophisticated peripheral circuits. For a full definition of their architecture and functions, reference is made to the Z80-SIO and Z80-CTC Technical Manuals and other commercial literature available from Zilog, Inc., and other sources.

In this example, the Z80 microprocessor 32 is driven at a frequency of 3.6864 Mhz by CLOCK signals received from the clock circuit 33 shown in FIG. 6. The Z80 microprocessor 32 accesses a 2k-byte external random access memory (Z-RAM) 34 for temporarily storing and formatting data and for storing control and status information. As seen in FIG. 10, the addresses for the external Z-RAM 34 are in a range from 8k (8,192) to 10k (10,240) of the microprocessor address range. The Z80 microprocessor 32 also accesses an 8k-byte erasable programmable read-only memory (EPROM) 35, which is seen in FIG. 6, and which stores processor instructions that are read and executed by the microprocessor 32 to perform its many functions. As seen in FIG. 10, these processor instructions are organized in a program which is addressed in a range from 0 to 8k of the microprocessor address range. Since these instructions are encoded in the physical structure of the EPROM 35, and are retained even if power is turned off, they are referred to as "firmware".

The Z80 microprocessor 32 controls the reading of processor instructions from the EPROM 35 and the reading and writing of data in the Z-RAM 34 by generating addresses through lines ZA0-ZA14 of a sixteen-line address bus (line ZA15 not being used). Lines ZA0-ZA10 connect to address inputs on the Z-RAM 34 to address 2k bytes of data. Lines ZA0-ZA12 connect to address inputs on the EPROM 35 to address 8k bytes of processor firmware. The data and firmware are actually communicated between the microprocessor 32 and the respective memories 34, 35 through the eight lines ZD0-ZD7 of the Z80 data bus. To activate or enable the various circuits, signals on lines ZA12-ZA14 are coupled to a chip select circuit 36, where they are decoded to select one or the other of the memories 34, 35, or the bus-controlling buffers 37, 38 according to their assigned address space and the address present on the address bus.

The Z80 microprocessor 32 also communicates with the common random access memory (C-RAM) 26, so that data is passed between the serial channel controller 24 and the backplane controller 25. Lines ZA0-ZA10 of the Z80 address bus are coupled through buffer 37 to address inputs on the C-RAM 26 to address 2k bytes of data. As seen in FIG. 10, these addresses reside in a 2k address range beginning at 12k. Lines ZD0-ZD7 of the Z80 data bus are coupled through buffer 38 to a C-RAM data bus, which connects to the data inputs on the C-RAM 26. The data buffer 38 is enabled at an enable (EN) input through a ZEN line by a signal decoded by the chip select circuit 36. A directional input DIR on the buffer 38 is controlled by the logic state of a read (ZRD) control signal transmitted by the Z80 microprocessor 32 through a buffer (not shown). The address buffer 37 is enabled when two control signals are received, the first is the Z ACK signal from the arbitration circuit 27, and the second is a C-RAM EN signal decoded by the chip select circuit 36 from the signals on lines ZA12-ZA14. This completes the description of the circuitry of the serial channel controller 24.

The other large portion of the inter-processor communication module 12 is provided by the backplane controller 25 of FIG. 7. The control element in this controller 25 is a backplane microcomputer 40, which in this embodiment is an 8-bit Model 8749 microcomputer available from Intel Corporation. This device combines a CPU with 2k bytes of EPROM (erasable programmable read-only memory) and a 128-byte internal RAM. A crystal oscillator 41, which connects to a pari of XTL inputs on the processor, drives the processor at a frequency of 10.9074 Mhz. Further details regarding the architecture, operation and instruction set for this microcomputer 40 are described in commercial literature available from Intel Corporation.

To summarize the elements of the backplane controller 25 shown in FIG. 7, the microcomputer 40 has eight bidirectional, multiplexed bus terminals MPX0-MPX7 for receiving or transmitting a byte of data, or for transmitting a byte of address information. These terminals connect to corresponding lines MPX0-MPX7 in an eight-bit multiplexed bus, to couple the backplane microcomputer 40 to an external RAM 42. The multiplexed bus is divided into a data bus branch with lines 49D0-49D7 and an address bus with lines A0-A7. The data bus lines 49D0-49D7 and an address bus with lines A0-A7. The data bus lines 49D0-49D7 connect to data terminals on the external RAM 42. The multiplexed lines MPX0-MPX7 are coupled through an address latch 43 to the address bus, which then connects to the eight lower order address terminals on the external RAM 42.

The microcomputer 40 also has two eight-bit I/O ports, Port 1 having terminals P10-P17 and Port 2 having terminals P20–P27. These I/O ports are referred to as "quasi-bidirectional" because each terminal is able to function as either an input or an output, and inputs and outputs can be mixed within each I/O port.

Figure 14:
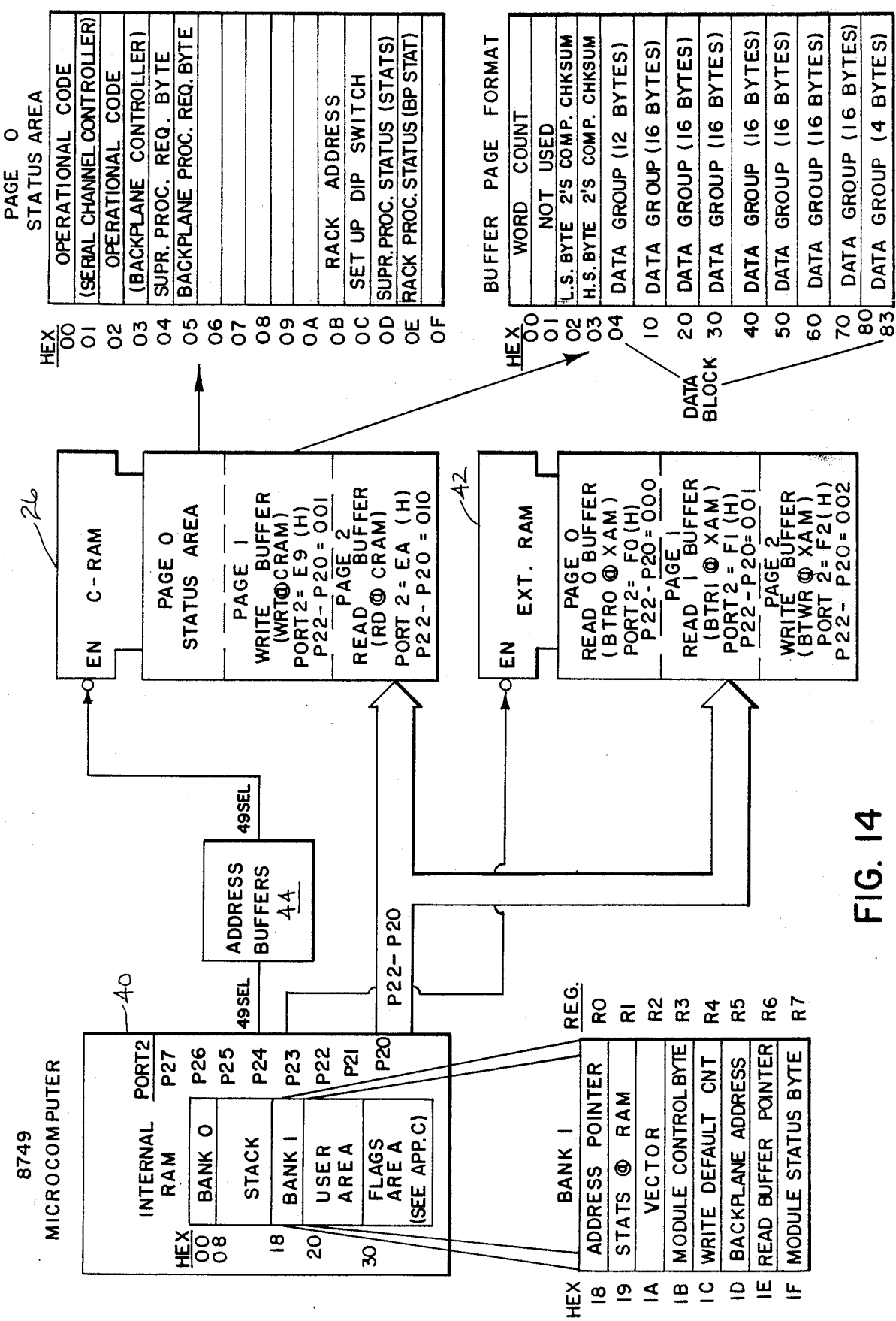
FIG. 14 is a memory map for the backplane controller and the common memory of FIG. 7.

I/O Port 2 is used, as illustrated in FIG. 14, for providing higher order bits of address information in a page-addressing mode of operation. Three terminals P20–P22 in I/O Port 2 connect to three higher order address lines A8–A10 to convey three additional address signals, which are necessary to address a 2k-byte quantity of data (8 pages of 256 bits each). The external RAM 42 and the C-RAM 26 each store 2k bytes of data. Signals from I/O Port 2 on lines P23 and P24 select either the external RAM 42 or the C-RAM 26 for access as seen in FIG. 14.

Referring back to FIG. 7 other terminals in the I/O Ports 1 and 2 are connected to enable bus-controlling buffers 44 and 45 and input and output latches 46 and 47 controlling access to a backplane data bus (lines I/O 0–I/O 7). Still other terminals in the I/O ports are connected for communicating handshaking signals with the arbitration circuit 27. The functions for the other specific terminals in the I/O ports are given in Appendix C.

Referring again to FIG. 7, the microcomputer 40 also has an INT input for receiving maskable interrupt signals, and two test inputs T0 and T1 which can be tested for the presence of a signal with conditional jump instructions. These inputs are connected to receive signals on an INT line, a backplane read (BP RD) line and a backplane write (BP WR) line. The signals to the INT, T0 and T1 inputs are generated by a backplane logic circuit 49 in response to a standard set of backplane control signals: STROBE, READ, WRITE and SEN (slot enable). This latter set of signals is generated, in this instance, by one of the in-rack system processors, such as the RACK 1 or RACK 2 processor seen in FIG. 2, when a block of I/O status data is being coupled to or from the inter-processor communication module.

The transfer of blocks of I/O status data from an in-rack system processor to an I/O module has previously been described in Struger et al., U.S. Pat. No. 4,293,924, cited earlier. As seen in FIG. 7, the in-rack processor (not shown) generates address and control signals which produce an SEN signal and, either a READ signal for a read operation or a WRITE signal for a write operation. In either event the backplane logic circuit 49 generates an INT signal to the INT input on the 8749 microcomputer 40. This causes the microcomputer 40 to jump or "vector" to a particular location in its on-board EPROM to execute a certain sequence of its firmware instructions. The backplane signals also cause either a BP RD signal or a BP WR signal to be coupled to its respective T0 or T1 input. In executing its firmware instructions, the microcomputer 40 will test these inputs to determine whether a read or write operation is being signaled.

I/O status data is transferred on lines I/O 0–I/O 7 when either the BP RD or BP WR signal is present. An I/O read operation is a transfer from the 8749 microcomputer 40 to the in-rack system processor (not shown in FIG. 7). An I/O write operation is a transfer from the in-rack system processor (not shown in FIG. 7) to the 8749 microcomputer 40.

For an I/O read operation, a byte of I/O status data is coupled from the latch/buffer circuit 48 to the I/O data bus when the BP RD signal enables this circuit at its EN input. Data is loaded into the latch 48 from the outputs of latch 47, which received the data from the 8749 microcomputer 40. In a preceding operation, data has been coupled to the latch 47 on lines 49D0–49D7, while the latch has been clocked by a signal derived from control signals from a WR terminal on the 8749 microcomputer (a write control signal terminal which is not shown) and the P25 terminal (not shown) on the microcomputer 40. The P25 terminal is active when the microcomputer 410 is to send or receive data through the backplane.

During system startup, a reset signal, derived from a processor enable (PROC EN) signal, is coupled to a reset (R) input on latch 47. This clears the latch 47 to receive the first byte of data from the 8749 microcomputer 40. In subsequent operations, new data from the 8749 microcomputer 40 simply "overwrites" or takes the place of previous data in latch 47.

For an I/O write operation, a byte of I/O status data is loaded from the I/O data bus into the latch 46 when the BP WR signal is received at its clock (C) input. The 8749 microcomputer 40 reads data from the latch 46 by generating a read control signal from an RD terminal on the 8749 microcomputer (a read control signal terminal which is not shown) and a control signal from the P25 terminal (not shown), which are coupled to an output enable (EN) terminal on the latch 46.

Both the I/O read operation and the I/O write operation begin with an interrupt of the 8749 microcomputer 40 and the writing of control information to the microcomputer 40 through latch 46. By testing the inputs T0 and T1, and by reading control information from the latch 46, the 8749 microcomputer 40 is able to set up communication with the in-rack system processor to transfer a block of I/O status data of up to 128 bytes in the selected direction.

Figure 8:
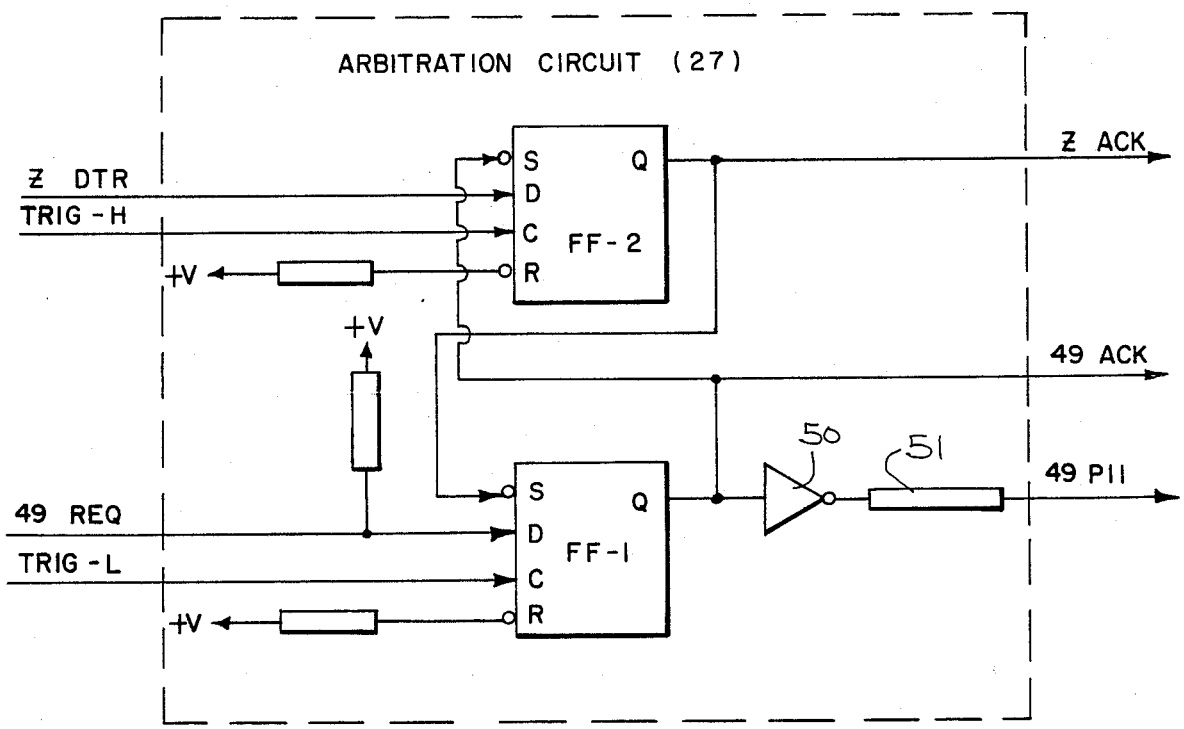
FIG. 8 is a schematic diagram of the arbitration circuit seen in FIGS. 3 and 6.

Referring to FIGS. 6 and 8, the arbitration circuit 27 will now be described in more detail. The clock circuit 33 in FIG. 6 generates a TRIG-H signal and a TRIG-L signal by clocking a D-type flip-flop (not shown) with the Z80 CLOCK signal, and taking the TRIG-H signal and the TRIG-L signal from the Q and ~Q outputs, respectively. The Q output is connected back to the D input through an inverter so that the two outputs toggle on each rising edge of the Z80 CLOCK signal. The TRIG-H signal and the TRIG-L signal are used as the clock signals for a pair of flip-flops FF-1 and FF-2 in FIG. 8.

The 8749 microcomputer 40 transmits a logic low signal (49 REQ) from terminal P10 in FIG. 7 to the D input of flip-flop FF-1 in FIG. 8 to request access to the C-RAM 26. Assuming the Q output of flip-flop FF2 is high, when the flip-flop FF-1 is clocked by the TRIG-L signal, the Q output of this flip-flop is set low-true. This output is connected to the 49 ACK line, and to an inverter 50 and resistor 51 to transmit a high-true signal back to terminal P11 on the 8749 microcomputer 40 that it has access to the C-RAM 26. Signals on the 49 ACK line and the 49 SEL line, the latter being coupled from terminal P24, are the signals for enabling the address buffers 44 which couple address signals A0–A10 from the 8749 microcomputer 40 to the C-RAM 26. The 49 ACK line in FIG. 8 is also connected to a low-true set (S) input of the second flip-flop FF-2 to hold its Q output in a high-false state. This Q output connects to the Z ACK line, and thereby prevents the Z80 microprocessor 32 from gaining access while the 8749 microcomputer 40 has access to the C-RAM 26.

At certain times the 8749 microcomputer 40 gives up access to the C-RAM 26 by signaling a logic high signal from its P10 output to the D input on flip-flop FF-1. On the next TRIG-L clock signal, the Q output goes high to remove both the active 49 ACK signal and the signal holding flip-flop FF-2 set. The Z80 microprocessor 32 clears the Z DTR output on the SIO circuit 30, and this signal is applied to the D input of flip-flop FF-2 to request access to the C-RAM 26. On the next TRIG-H signal, the Q output of the second flip-flop goes low-true to enable the address buffers 37 for coupling address signals A0–A10 from the Z80 microprocessor 32 to the C-RAM 26.

When the Z80 microprocessor 32 has access to the C-RAM 26, access is denied to the 8749 microcomputer 40 by transmitting a low-true signal to the set (S) input of flip-flop FF-1 through the Z ACK line. The Z80 microprocessor 32 releases the C-RAM 26 by changing the state of the Z DTR line to a logic high, and on the next active TRIG-H signal, the Q output of flip-flop FF-2 is switched high or "off". This completes the description of the arbitration circuit, and this also completes the description of the electronic hardware used in carrying out the invention, except that a list of commercially available circuits for carrying out the invention is provided in Appendix A.

F. Programmed Operation of the Z80 Microprocessor

Referring to FIG. 11, on application of power, represented by start block 52, the Z80 microprocessor 32 executes a series of power up and set up routines represented by process block 53. These include the following diagnostic sequences:

(1) an EPROM checksum test to verify the proper operation of the EPROM 35;

(2) a RAM integrity test to verify normal read and write operations from the internal RAM;

(3) a test to verify normal read and write operations relative to the SIO circuit 30;

(4) a test to verify a normal timer interrupt from channel 3 of the CTC circuit 31; and (5) a RAM integrity test to verify accessibility and normal read and write operations from the C-RAM 26.

If these tests are successful, the Z80 microprocessor 32 sets up an operational status code in lines 02 and 03 of Page 0 of the C-RAM 26, which is shown in FIG. 14. The Z80 microprocessor 32 also looks for an operational status code in lines 00 and 01 of Page 0 of the C-RAM 26 that is set up when the backplane microcomputer 40 has successfully completed its power up and diagnostic routines. If one of the Z80 microprocessor power up tests is unsuccessful, the Z80 operational code is not set up. This will eventually be sensed by the backplane microcomputer 40, which will then signal a hardware fault.

When the Z80 microprocessor 32 has indicated its operational status, and has detected the operational status of the backplane microcomputer 40, it continues executing start up routines to read parameters set with DIP switches (not shown). These parameters include the rack size and starting I/O slot address, the mode of I/O status data transfer (either "discrete" or "block transfer"), a baud rate selection for the serial data channel, and the supervisor protected update option. The SIO circuit 30 and the CTC circuit 31 are then activated for generating interrupts.

Figure 11A:
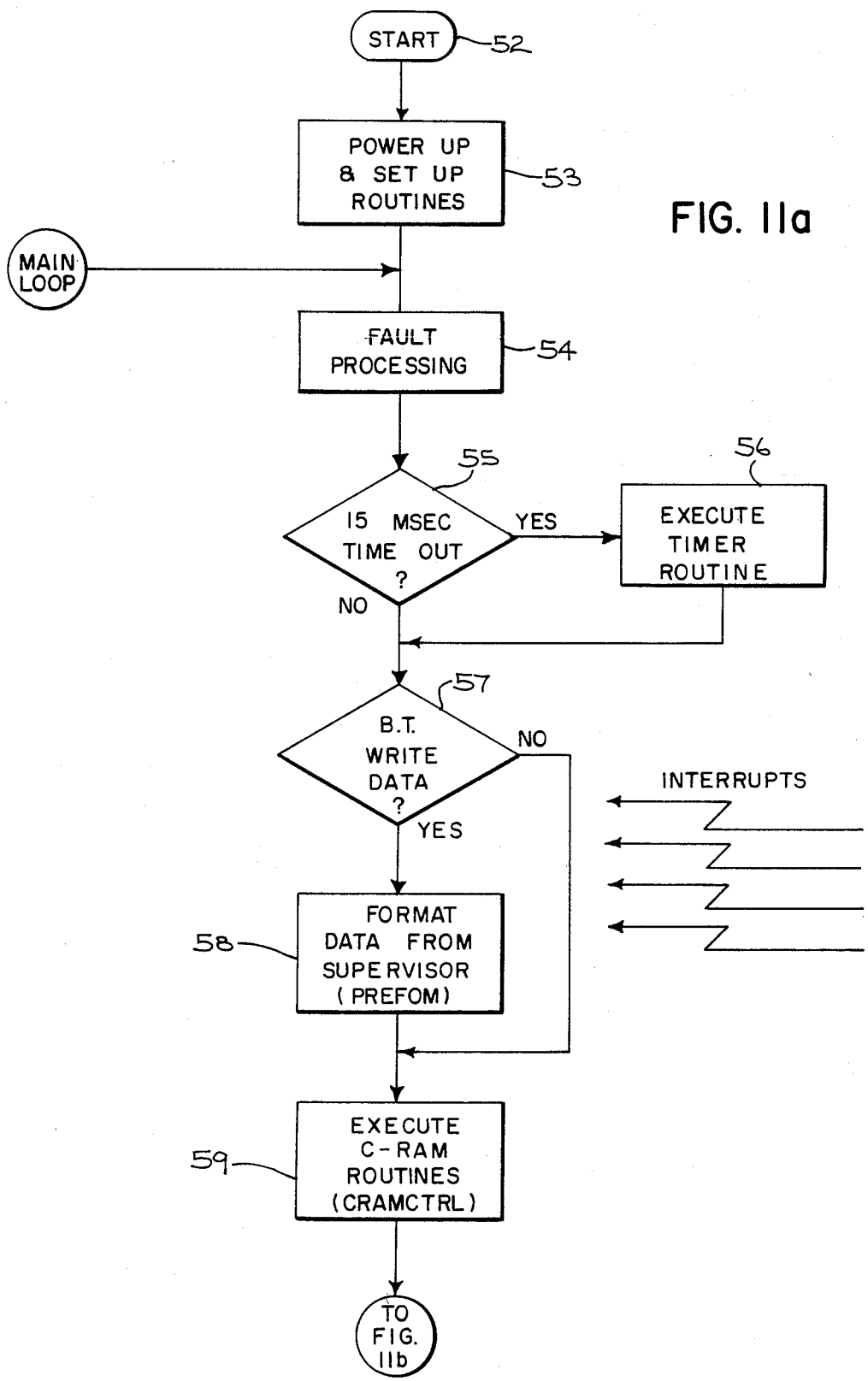
FIG. 11a and 11b are a flow chart of a main loop of program routines executed by the serial channel controller of FIG. 6.
Figure 11B:
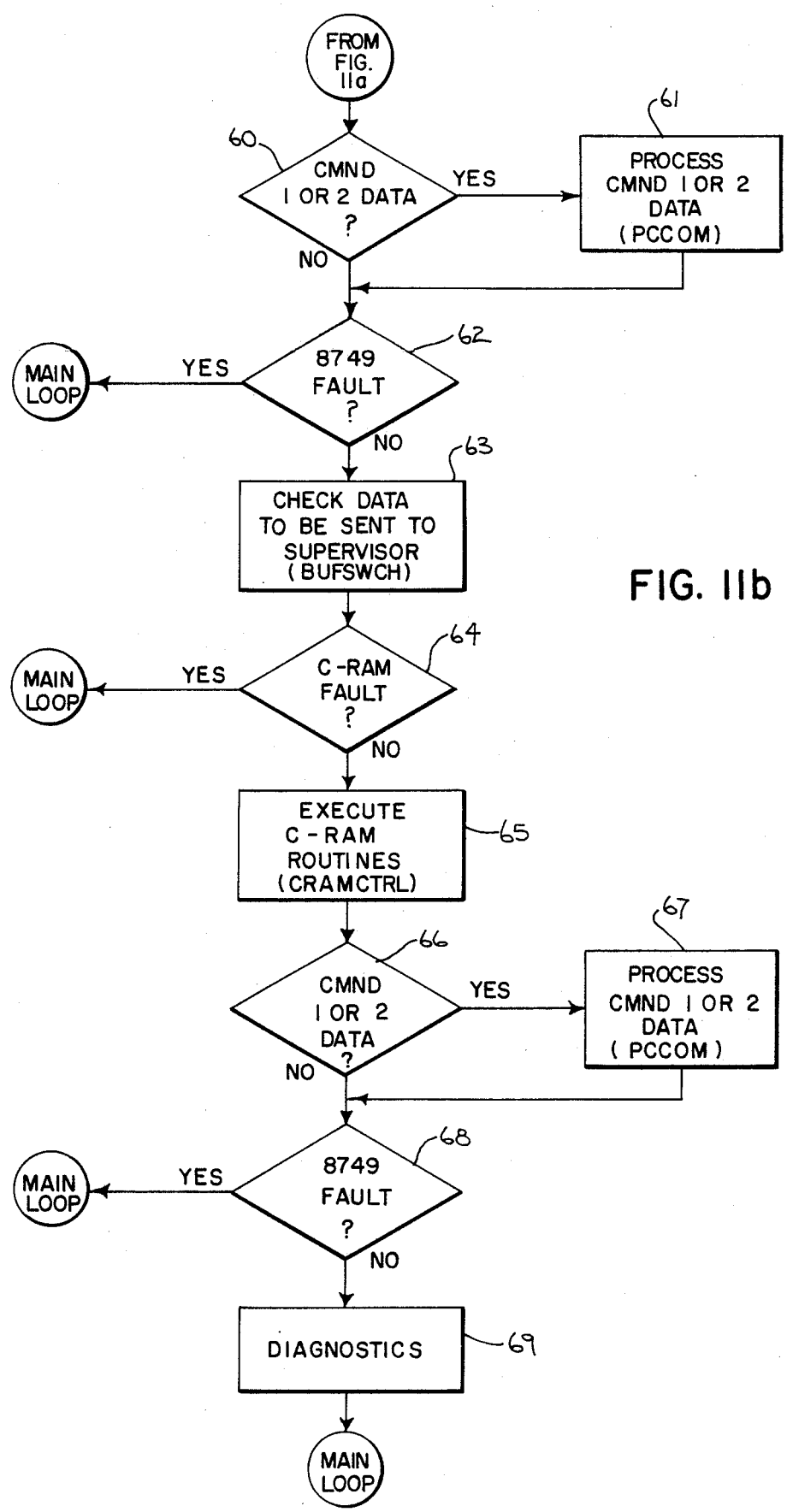

After initialization is complete, the Z80 microprocessor 32 proceeds to the first block in a MAIN LOOP of routines represented by blocks 54–69 in FIGS. 11a and 11b. Process block 54 represents execution of instructions to check the fault status of the Z80 microprocessor 32. If a fault is indicated a fault handling routine is called to determine the type of fault and the next action to be taken. Assuming no faults, the Z80 microprocessor 32 then checks a time out flag, which is represented by decision block 55, to determine whether a 15-millisecond time out signal has been transmitted on CTC channel 3. If the test is positive, as represented by the "YES" branch, the Z80 microprocessor 32 calls a timer routine represented by process block 56. In executing this routine the Z80 microprocessor 32 determines whether a number of 15-millisecond time out signals have been generated since the last valid frame has been received over the serial data channel 11. If 100 milliseconds have passed (7 time outs @ 15 milliseconds), a fault is signaled. Whenever a valid frame is received the counter for signaling a fault is reset. The circuitry and programming to accomplish the 100-millisecond timing function is referred to as the communication watchdog timer.

If a 15-millisecond time out is not signaled when the instructions represented by a decision block 55 are executed, as represented by the "NO" result in FIG. 11, the Z80 microprocessor 32 then checks a flag bit in memory to see whether a block of "block transfer" write data has been received from the supervisory processor 10. This check is represented by decision block 57. If such data has been received, as represented by the "YES" result, the Z80 microprocessor 32 next executes a PREFOM routine represented by process block 58 in FIG. 11a and block 70 in FIG. 9 to format the block of I/O status data before it is transferred to the C-RAM 26. Then, as represented by process block 59 in FIG. 11a, the Z80 microprocessor 32 executes a group of CRAMCTRL routines for transferring data to and from the C-RAM 26.

Figure 9:
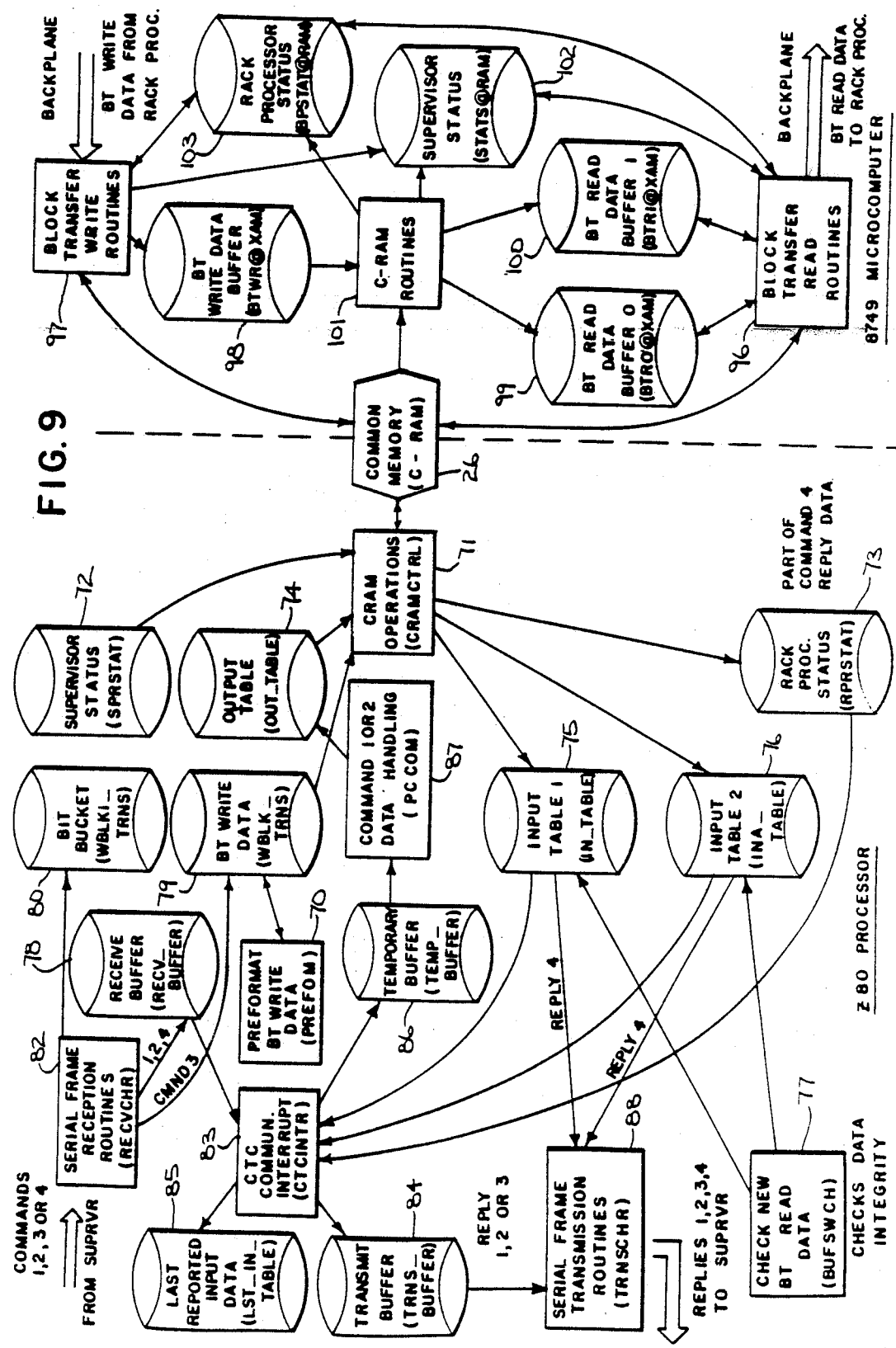
FIG. 9 is a data flow schematic diagram for the inter-processor communication module of FIG. 3.

The C-RAM sequences are also represented by the block 71 in FIG. 9 labeled CRAMCTRL, the acronym used in Appendix B. In executing these sequences, discrete I/O status data are moved from an output table (OUT_TABLE) represented by barrel 74 to the C-RAM 26. Block transfer I/O status data are moved from the BT write data buffer represented by barrel 79 to the C-RAM 26, provided that the data has been properly formatted by the PREFOM routine discussed earlier. In the other direction, discrete I/O status data and block transfer I/O status data are moved from the C-RAM 26 to one of the input tables IN_TABLE and INA_TABLE, represented by barrels 75 and 76.

When transferring block transfer I/O status data to the tables 75 and 76, a check is made to see whether or not the protected update mode has been selected for the supervisory processor 10, and whether or not the last data transferred to tables 75 and 76 has been read by the supervisory processor 10. If space is available for receiving the new block transfer data, the data is transferred to a table that is not in use. The use of the two input tables 75 and 76 is alternated so that data can be transferred from the C-RAM 26 to one table while data is present in the other table awaiting transmission to the supervisory processor 10.

In addition to I/O status data, the CRAMCTRL routines are executed to move new status information regarding the supervisory processor 10 to the C-RAM 26, and to move new status information regarding serial communication to the backplane controller 25. A supervisory processor status byte (SPRSTAT) in the Z-RAM 34, represented by barrel 72 is moved to a STATS location in the C-RAM 26 that is seen in FIG. 14. A local area processor status byte is updated and moved from a BPSTATS location in the C-RAM 26 seen in FIG. 14 to a RPRSTAT location in the Z-RAM represented by barrel 73.

Referring next to FIGS. 9 and 11b, after performing transfers to and from the C-RAM 26, the Z80 microprocessor 32 checks for the receipt of discrete I/O status data (also referred to as Command 1 or Command 2 data) in temporary buffer 86 in FIG. 9 by executing a check represented by decision block 60 in FIG. 11b. If such data has been received in the temporary buffer 86, it is awaiting transfer to the output table (OUT_TABLE) 74. This transfer is performed by calling a PCCOM subroutine represented by process block 61 in FIG. 11b. This sequence of blocks 60 and 61 is preferably executed upon return from access to the C-RAM 26 as a technique for avoiding interruption of the PCCOM subroutine when accessing the C-RAM 26. Such an interruption might cause data being transferred into the output table 74 to become mixed with a previously transferred group of data awaiting further transfer to the C-RAM 26.

After executing the PCCOM subroutine, the Z80 microprocessor 32 checks the fault status of the backplane microcomputer 40 as represented by decision block 62. If a fault is indicated the Z80 microprocessor 32 returns to the beginning of the MAIN LOOP to process the fault. Assuming no such fault, the Z80 microprocessor 32 executes a BUFSWCH routine represented by process block 63, and represented by block 77 in FIG. 9. This routine checks for new I/O status data from the C-RAM 26. If new I/O status data is present, a subroutine is called to verify the data with a checksum test. If a new block of data for the block transfer mode is detected this subroutine fills any unused area in the input table with data bytes of zeroes up to 128 bytes.

Next, as represented by process block 64 in FIG. 11, a check is made for a C-RAM fault, before the CRAMCTRL routines are executed as represented by process block 65. The CRAMCTRL routines are executed a second time because it is desired to gain access to the C-RAM 26 frequently, but to limit the duration of each access period 26. And, because the CRAMCTRL routines are executed again, the PCCOM subroutine is executed upon return from the C-RAM 26, provided that Command 1 or Command 2 data is ready for transfer downstream, as represented by blocks 66 and 67. As the last portion of the MAIN LOOP of firmware routines, the fault status of the backplane microcomputer 40 is checked as represented by decision block 68 and a diagnostics routine, represented by process block 69, is executed to check that the RAM circuits in the serial channel controller 24 are functioning properly. If a fault is detected, or upon completion of the diagnostics, the Z80 microprocessor 32 loops back to block 54 in FIG. 11a.

As the MAIN LOOP of routines is executed, it is periodically interrupted by the interrupt signals and routines shown in FIG. 10. The interrupt signals from the SIO circuit 30 and CTC circuit 31 cause the Z80 microprocessor 32 to vector to one of the interrupt routines represented by blocks 90-95 in FIG. 10. When a start flag byte in one of the Command messages is received by the SIO circuit 30, the circuit achieves synchronization with the incoming data stream. When a non-flag byte received, a RECEIVE CHARACTER interrupt is generated and the Z80 microprocessor 32 vectors to the routine represented by process block 93 in FIG. 10. It reads the incoming character or byte and compares it with its own system I/O address. If a match is detected, the SIO circuit 30 will be set for successive interrupts of the same type for each byte of information in the frame up to the second CRC byte. A flag bit is set to cause the serial interface processor 32 to save all further bytes in the current frame, up to the CRC bytes. If a matching address is not detected, the flag bit is reset to cause the Z80 microprocessor 32 to ignore any further bytes received in the current frame, up to the CRC bytes.

When the Z80 microprocessor 32 detects a message being sent to its host inter-processor communication module 12, it checks the next received byte to determine which of the four types of Command message is being received. For Command 1, Command 2 or Command 4, a pointer is set up to direct incoming data into a receiver buffer (RECV—BUFFER) represented by barrel 78 in FIG 9. For a Command 3 message, the pointer is set up to direct incoming data into a BT write data buffer (WBLK—TRNS) represented by barrel 79 in FIG. 9. For a special condition in which a block of I/O status data received in a Command 3 message is to be ignored, the pointer is set up to direct incoming data into a "dead end" buffer (WBLK1—TRANS) represented by barrel 80 in FIG 9.

When the end flag in one of the Command messages is received by the SIO circuit 30, it generates an interrupt address to a SPECIAL RECEIVE CHARACTER ROUTINE represented by process block 94 in FIG. 10. The Z80 microprocessor 32 then obtains the second of the two CRC bytes that were received by the SIO circuit 30 just before the end flag. After receiving the CRC bytes, the flag bit mentioned earlier is checked to determine whether or not the message was directed to this particular inter-processor communication module 12. An addressing error is assumed when 256 messages have been received without a matching address. If the message is addressed to the receiving inter-processor communication module 12, the data in the message is validated by checking a CRC status bit generated by the SIO circuit 30 and by checking the number of bytes received. This completes receipt of a Command message.

Before a reply can be transmitted, the serial data channel 11 must be idle for a specified time to allow transient signals to settle. This is determined either by the reception of a character signaling that the channel has been idle during the data checking, or the SIO circuit 30 can generate an EXTERNAL STATUS INTERRUPT. The three types of receiver interrupts discussed so far, the RECEIVE CHARACTER interrupt, the SPECIAL RECEIVE interrupt and the EXTERNAL STATUS interrupt are represented generally by process block 82 in FIG. 9. When the EXTERNAL STATUS interrupt is generated, the Z80 microprocessor 32 vectors to the routine represented by process block 95 in FIG. 10. Execution of this routine will detect the condition signaling that the channel has been idle and will introduce an additional delay loop. A further routine is then called to turn off the receiver and to turn on the SIO transmitter, which causes the SIO to send start flag bytes. The CTC communication interrupts represented by process block 91 in FIG. 10 and process block 83 in FIG. 9 are set up to time the transmission of the start flag bytes.

After the timed interval the SIO circuit 30 transmits a further start flag byte that will precede a Reply message to the supervisory processor 10. The CTC circuit 31 generates the interrupt on its internal channel 2 after the third start flag byte. The channel 2 output is connected to the INT input on the Z80 microprocessor 32 through the same line as the "channel 3" 15-millisecond timer. The receipt of the channel 2 interrupt causes the execution of the START AND STOP XMTR routines represented by process block 83 in FIG. 9 and process block 91 in FIG. 10. During execution of these routines the Reply message number is determined and the Reply number byte is loaded into the transmit buffer (TRNS_BUFFER) represented by barrel 84 in FIG. 9. If a Reply 4 is detected, the excess data, insufficient data and "old data" conditions are checked and the rack processor status byte is updated, if necessary. The RPRSTAT byte is then moved from its storage at element 73 to the beginning of the input table 75 or 76 from which block of I/O status data will be transmitted to the supervisory processor 10 in the next Reply message.

If a Reply 1 or a Reply 2 is to be sent, a REPLY 12 subroutine (not shown in FIG. 9) is called to format the bytes of data that will be transmitted as part of the message. These are loaded into the transmit buffer 84 at locations following the reply byte. As part of this task, the status of the backplane controller is checked for excess or insufficient data and the rack processor status byte, which is stored at the location represented by barrel 73 in FIG. 9, is loaded into the transmit buffer 84 as the second byte of I/O status data going to the supervisory processor 10.

If the reply message is a Reply 2 message, the I/O status data (input data) is checked for data that has changed since the last such reply message, and a mask byte is set up as part of the reply. By using the mask, not all of the input status data for the rack is sent in each Reply 2 message, but only a selected pair of bytes and any bytes that have changed since the last reply from the rack. To keep track of data that has changed since that time, the last input status data sent back to the supervisory processor 10 from each location in the rack is maintained in a table (LST_IN_TABLE) represented by barrel 85 in FIG. 9. If the reply message is a Reply 1 message, all of the input data is reported. The REPLY 12 subroutine also moves incoming I/O status data from the receive buffer 78 to a temporary buffer 86.

If the CTC interrupt did not occur during the update of data in the C-RAM 26, a PCCOM subroutine, represented by process block 87, is called to examine the I/O status data received in any Command 1 or Command 2 message (discrete mode) for changed output status data. Such data is then transferred from the temporary buffer 86 to the output table 74 in FIG. 9, for further transfer to the C-RAM 26 during execution of the C-RAM routines of the MAIN LOOP. The PCCOM subroutine 87 also includes instructions to detect a module control word (MCW) which is sent in place of a byte of output status data to initiate a block transfer of I/O status data. Execution of further instructions then sets appropriate control or status bits to continue processing of the pending block transfer.

Upon return to the CTC interrupt routine, the supervisor address byte is loaded into a register in the SIO circuit 30 as the first byte to be transmitted after the start flag byte that was sent earlier, and the interrupt input on the Z80 microprocessor 32 is enabled to receive the interrupt signal that will occur when the transmit buffer has become empty. The CTC interrupt routine then sets the data pointer to point to the first word in the transmit buffer 84.

Transmission on the serial data channel is signaled by a succession of TRANSMIT BUFFER EMPTY interrupts, represented by process block 88 in FIG. 9, and by process block 92 in FIG. 10. There are several different sequences of instructions that will be performed depending on whether the interrupt is the first TRANSMIT BUFFER EMPTY interrupt or a succeeding interrupt. On the first such interrupt the type or number of Reply message is determined, and if a Reply 4 message is being sent, the data pointer previously pointing to the transmit buffer 84 is now switched to point to the first byte in one of the input tables 75 and 76. The sequence of TRANSMIT BUFFER EMPTY interrupts will select the bytes to follow the supervisor address byte in transmission to the supervisory processor 10, a different sequence of bytes being transmitted for Replies 1 and 2 as compared with Reply 4. For Reply 3 only the Reply byte is sent.

After the string of I/O status data and any checksum or status information has been transmitted, an end interrupt sequence is executed in response to two TRANSMIT BUFFER EMPTY interrupt signals to mark the beginning and completion of transmitting the two CRC bytes from the SIO circuit 30 to the supervisory processor 10. The SIO circuit then sends an end flag. The Z80 microprocessor 32 then sets up a timing period for the CTC circuit 31 to time the sending of the end flag, and interrupt to signal back to the Z80 microprocessor 32 when the end flag has been sent. Upon receiving this interrupt, the Z80 microprocessor 32 causes the SIO circuit 30 to send an abort signal and to generate a further interrupt to signal completion of this transmission. The transmitter portion of the SIO circuit 30 is then turned off and the receiver portion is turned on to look for a character sent to it from the supervisory processor 10.

This has been a description to assist in understanding the operation of the Z80 microprocessor 32 and the serial channel controller 24. For further details, reference is made to the listing of individual firmware instructions in Appendix B.

G. Programmed Operation of the Backplane Microcomputer

As shown in FIG. 9, the backplane microcomputer 40 executes firmware instructions organized in a group of block transfer "read" routines 96 and in a group of block transfer "write" routines 97 to transfer blocks of I/O status data between buffer storage areas 98–100 in the external RAM 42 and the backplane 19. To set up data in these buffer storage areas 98–100, the backplane microcomputer 40 executes a group of C-RAM routines 101 to move data between storage areas in the C-RAM 26 and the buffers in the external RAM 42.

The backplane controller 25 transfers both "discrete" I/O status data and "blocks" of I/O status data as blocks, as it is presently limited to one mode of transfer through the backplane. In the external RAM 42, a BT write data buffer 98 (identified as BTWR@XAM in Appendix C) receives a block of I/O status data from a local area processor, such as the processor 14 in FIG. 1. From there the data will be moved to the C-RAM 26. A BT read data buffer 99 (identified as BTRl@XAM in Appendix C) or a BT read buffer 100 (identified as BTRO@XAM in Appendix C) receives I/O status data moving downstream from the supervisory processor 10—through the C-RAM 26—to the local area processor.

In a "protected update" mode for the supervisory processor 10, data being transmitted to the supervisory processor 10 is protected from overwriting or cancellation in the C-RAM 26. This could also occur if two transfers were accepted from the backplane controller 25 before the data could be read by the serial channel controller 24. In executing the C-RAM routines 101, a check is made to determine that the last write data loaded into the C-RAM 26 has been taken by the serial channel controller 24, before new data can be transferred to the C-RAM 26 from the BT write data buffer (BTWR@XAM). If the last data has not been taken by the serial channel controller 24, the backplane microcomputer 40 will not complete the transfer, but will look for a block of I/O status data for transfer downstream.

Besides transferring I/O status data, the backplane microcomputer 40 also transfers the status information concerning the supervisory processor 10 and the local area processor. The STATS byte is maintained in an area of the internal RAM identified as STATS@RAM in Appendix C and represented by barrel 102 in FIG. 9. The BPSTAT byte is maintained in an area of the internal RAM identified as BPSTAT@RAM in Appendix C and represented by barrel 103 in FIG. 9. The STATS and BPSTAT bytes are also stored at locations OD(hex) and OE(hex) in Page 0 the C-RAM 26 as shown in FIG. 14.

Referring to FIG. 14, the data memories in the backplane controller 25 are seen in more detail. The internal RAM addresses shown in hexadecimal are not the absolute addresses loaded into the program counter, but are register numbers used in a particular set of data move instructions. The internal RAM includes Bank 0 with eight byte-wide registers 00–07 (hex) and a STACK of sixteen byte-wide registers 08–17 (hex) for storing the previous state of certain internal registers in the microcomputer 40 during execution of subroutines. Bank 1 includes eight byte-wide registers R0–R7 at 18–1F (hex) for storing the items seen in the expansion of Bank 1 illustrated in FIG. 14. The processor status word STATS @ RAM is maintained at location 19 (hex). Registers 20 (hex) et seq. are available as user memory. In this example, registers 30–3F (hex) are used as a FLAGS AREA, where other status words such as the backplane status byte BPSTAT@RAM are stored. This FLAGS AREA is mapped in Appendix C.

Referring to FIG. 14, the backplane microcomputer 40 addresses the C-RAM 26 and the external RAM 42 through I/O Port 2. Page 0, page 1 and page 2 of the C-RAM 26 are addressed at hexadecimal addresses E8, E9 and EA, respectively. When any of these addresses is generated on lines P20–P27, line P24 will carry a logic low signal, which is coupled through the address buffers 44 to the enable (EN) input on the C-RAM 26. The signals on lines P22–P20 will then select one of the page areas in the C-RAM 26. The lower eight bits of address A0–A7 are generated to select one of 256 locations within each page.

As seen in FIG. 14, Page 0 is reserved for status information. The operational codes for the Z80 microprocessor 32 and the backplane microcomputer 40 are stored in the first four locations 00–03 (hex). The supervisory processor 10 and any local area processor will signal that they are sending data to the other through the request bytes at locations 04 and 05 (hex) in Page 0 of the C-RAM 26.

The address assigned the rack holding the interprocessor communication module 12 is read from a rack DIP switch (not shown) and is stored in location 0B (hex) of Page 0. A "set up" DIP switch (not shown) is also read through the backplane and its setting is stored at location 0C (hex) in Page 0. This switch is set to select the protected update mode of operation, the discrete or block mode of I/O status data transfer, the baud rate of the serial data channel and other operating parameters of the interprocessor communication module 12. The C-RAM versions of the supervisor status byte STATS@RAM and the backplane status byte BPSTAT@RAM are stored at locations 0D (hex) and 0E (hex) in Page 0 of the C-RAM 26.

Pages 1 and 2 of the C-RAM 26 are the read and write buffers for I/O status data being transferred between the serial channel controller 24 and the backplane controller 25. These pages have the same generalized format, which is illustrated in FIG. 14. Locations 04(hex)–83(hex) store up to the maximum of 128 bytes of I/O status data which can be transferred as a single block. Byte 0 of the page stores the number of two-byte data words in the block, and bytes 02 (hex) and 03 (hex) store the least significant byte and the most significant byte of the 2's complement of a two-byte checksum for the block of data.

The backplane microcomputer 40 addresses the external RAM 42 at Port 2 addresses F0(hex)–F2(hex), which produces a logic low on line P23 that enables the external RAM 42 at its enable (EN) input. Pages 0–2 are then selected by the signals on lines P22–P20 and addresses within the page are selected by address signals on lines A0–A7 in the same manner as described for the C-RAM 26. Page 0 is used as the READ 0 BUFFER (BTR0@AM); page 1 is used as the READ 1 BUFFER (BTR1@XAM); and page 2 is used as the WRITE BUFFER (BTWR@XAM). The format of the pages or buffers in the external RAM 42 is the same as that shown for the C-RAM 26 in FIG. 14. By transferring data between the buffers of the C-RAM 26 and the buffers of the external RAM 42, the backplane microcomputer 40 completes the communication link between the backplane and the supervisory processor 10.

Figure 12:
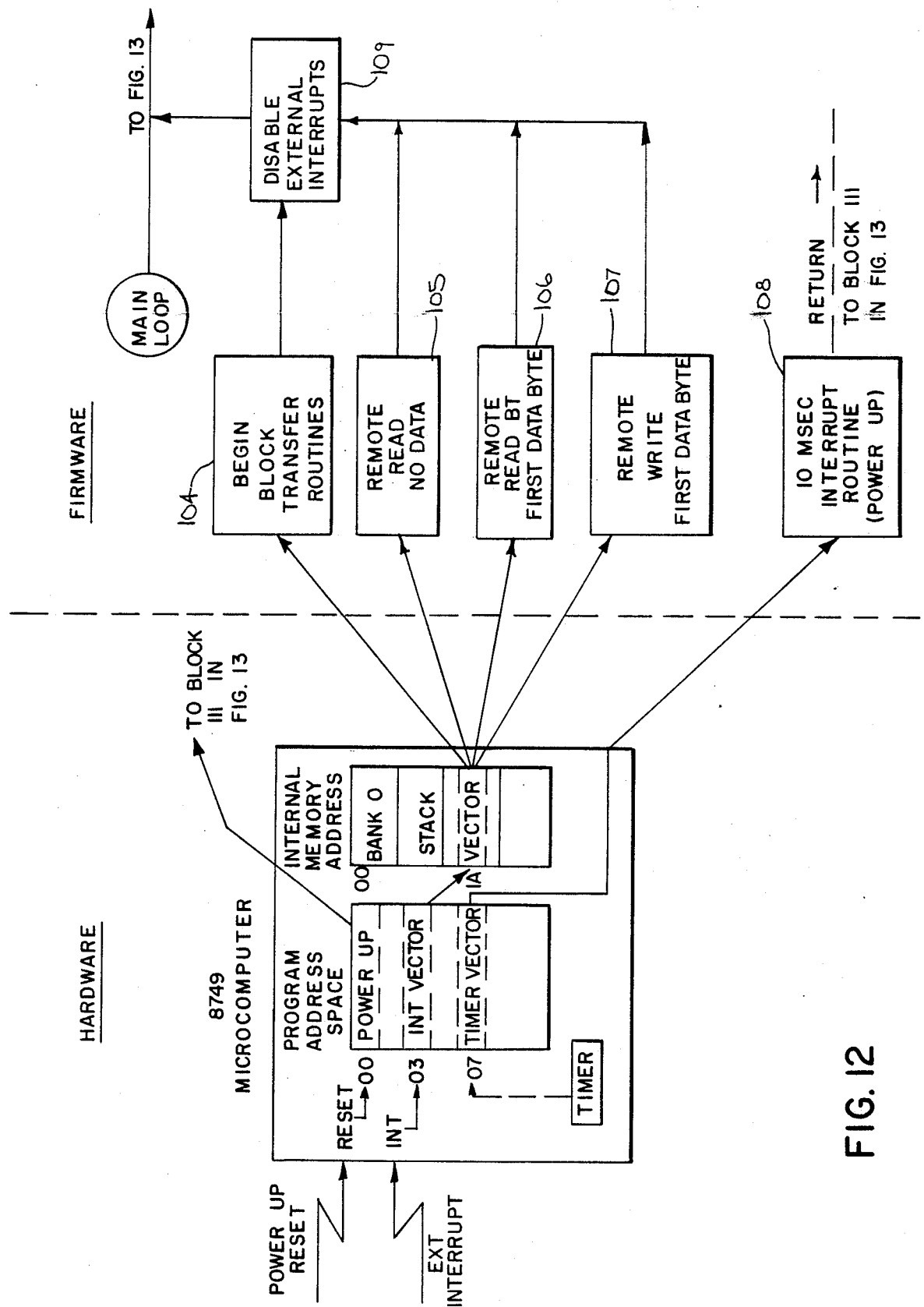
FIG. 12 is a hardware-firmware schematic for the backplane controller of FIG. 7.
Figure 13:
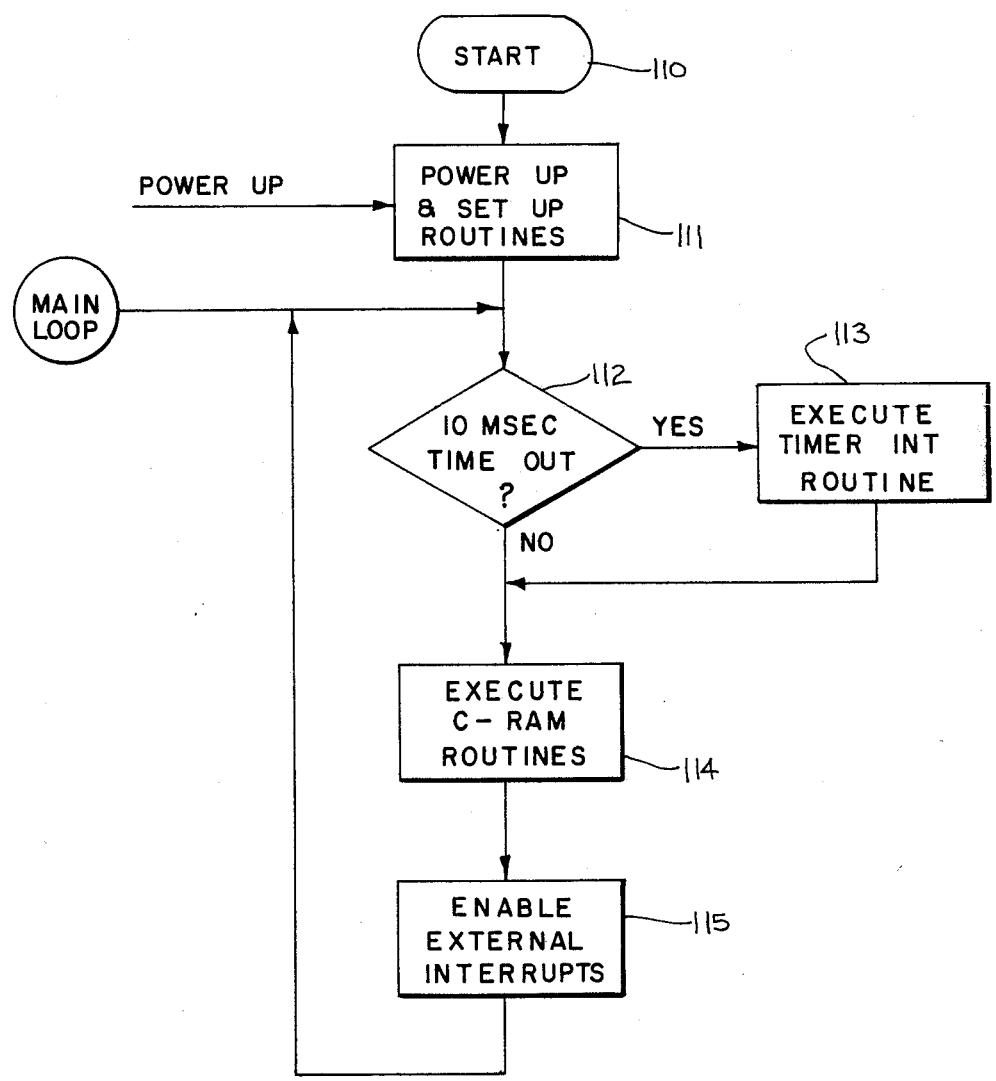
FIG. 13 is a flow chart of a main loop of program routines executed by the backplane controller of FIG. 7.

The organization of the firmware instructions for the backplane microcomputer 40 is summarized in FIGS. 12 and 13. The 8749 microcomputer 40 has a program memory with 2k addresses—this is the number of memory locations which can be directly addressed using its 12-bit program counter (PC register). Three of these locations 00, 03 and 07 (hexadecimal) seen in FIG. 12 are loaded into the program counter in response to certain hardware signals. For location 00, this event is referred to as a "reset". For locations 03 and 07, this event is referred to as a "vector". At these locations there are instructions, which when executed, cause the microcomputer 40 to jump to a location that is not in sequence.

Thus, when a power up reset signal is received at a specified input on the backplane microcomputer 40, the instruction at location 00 (hex) in an internal EPROM is executed. This causes a jump to a next instruction in a power up routine, which is represented by start block 109 in FIG. 13.

Similarly, when an interrupt signal is received at the INT input, a jump indirect instruction at location 03 (hex) in an internal EPROM is executed. This instruction uses an address stored at location 1A (hex) in the internal RAM, as the address of the next instruction. Upon executing this instruction, the microcomputer 40 is directed to a next instruction to begin executing one of four sequences of instructions represented by blocks 104–107, according to when the interrupt occurs during execution of the full program.

An internal timer interrupt signal causes the microcomputer 40 to execute a jump instruction at location 07 (hex). During the power up sequence, this timer is set to time out at the end of 10 milliseconds. The microcomputer 40 will then jump to a next instruction in a 10-millisecond timer interrupt routine represented by process block 108. Although the 10-millisecond timer is used throughout the period of program execution, its expiration during other portions of the program does not cause an immediate interrupt. Instead, a timer flag is set to signal the time out, and this flag is checked, as represented by decision block 112 to determine whether a slightly different version of the 10-millisecond timer routine should be executed. The execution of this other version is represented by process block 113 in FIG. 14.

A "main loop" of firmware instructions is represented by blocks 110–115 in FIG. 13. After starting execution upon power up, the microcomputer 40 executes a group of start up routines represented by process block 111 to check the operation of its memory circuits including:

(1) a checksum test of its internal EPROM;
(2) a test of read and write operations of its internal RAM; and
(3) a similar test of read and write operations of the external RAM.

The backplane microcomputer 40 then reads its system I/O address and selected modes of operation from a DIP switch (not shown) and stores this information so that it can be passed to the Z80 microcomputer 32. A test of access to the C-RAM 26 is executed and the operational status of the Z80 microprocessor 32 is read. If the result of these checks is positive, the backplane microcomputer 40 will set its operational code when it has access to the C-RAM 26.

If any 10-millisecond timer interrupts occur during execution of the power up routines, the routine represented by block 108 is executed, and the microcomputer 40 returns to the point in power up routines where it departed upon the interrupt. After completing initialization, the microcomputer 40 then enters the main loop and tests for a time out as represented by decision block 112. Assuming the test proves negative, it then seeks access to the C-RAM 26 and executes a group of C-RAM routines, represented by process block 114, for transferring I/O status data between the C-RAM 26 and the buffers 98–100 in its external RAM 42. In executing these routines, the backplane microcomputer 40 also transfers the BPSTAT byte upstream to the C-RAM 26 from the internal RAM area represented by barrel 103 in FIG. 9 and reads the latest status of the supervisory processor 10 via the supervisor status byte (STATS), which is transferred downstream to the area of internal RAM represented by barrel 102 in FIG. 9. If the number of bytes of I/O status data requested for transfer on the backplane is greater than the number available from the supervisory processor 10, the BPSTATS will be updated and the block of data being prepared for transfer will be filled with bytes of zeroes up to the maximum block size. Then, if the INT input has previously been disabled, it re-enables this input, as represented by process block 115. The program is written to allow at least one cycle through the main loop after each such interrupt.

An external interrupt—with the INT input enabled—causes a jump to a sequence in the group of sequences represented by process blocks 104–107 in FIG. 12. A starting point at the beginning of the block transfer routines is represented by process block 104. There, a B.T. module control word from the in-rack processor 14 is examined and a B.T. module status byte is sent back to the in-rack processor 14. This applies to read block transfers, write block transfers and bidirectional block transfers. If the block transfer is a "local" block transfer—a block transfer from an in-rack processor—instructions will be executed in response to a sequence of interrupts to complete the transfer of I/O status data and a checksum.

A "remote" block transfer is one that is accomplished in cooperation with a local area processor that is not in the same rack as the inter-processor communication module 12, which is possible in other system configurations within the scope of the invention. When a request for such a transfer is detected during execution of the routines represented by process block 104, the vector at location 1A (hex) in FIG. 12 is altered. The basic group of block transfer routines is then exited, and on the occurrence of the next external interrupt, the microcomputer 40 will vector to the routines represented either by process block 106 or 107, depending on the direction of the block transfer. The appropriate block will then be executed to complete the transfer of I/O status data and a checksum. When no data is to be transferred in a remote block transfer read operation, an interrupt will cause the microcomputer 40 to execute the sequence represented by process block 105.

In executing a sequence of interrupts to accomplish a remote block transfer, the backplane microcomputer 40 experiences some waiting time between interrupts. While waiting to receive I/O status data from the local area processor, the backplane microcomputer 40 will report the BPSTAT byte to the C-RAM 26, and while waiting for I/O status data to be taken by the local area processor it will read the latest status of the supervisory processor 10 via the STATS byte. The supervisor status byte (STATS) is transferred downstream from the area of the internal RAM represented by barrel 102 in FIG. 9, and the backplane status byte (BPSTATS) is transferred upstream to the C-RAM 26 from the area of internal RAM area represented by barrel 103 in FIG. 9.

Whenever one of the four blocks 104–107 is exited, instructions represented by process block 109 are executed to disable external interrupts until the main loop of routines has been executed at least once. This assures that one cycle of the main loop will be executed before the next interrupt.

This has been a description to assist the understanding of the operations of the backplane microcomputer 40 and the backplane controller 25. For further details, reference is made to the listing of firmware instructions in Appendix C.

H. Inter-processor Communication

Referring again to FIG. 2, and in view of the above detailed discussion of the inter-processor communication module 12, it should now be appreciated that an on/off bit of data can be transferred in a group of I/O status data communicated from a data table in a local area processor 14 or 14' to a data table in a supervisory processor 10. For example, in FIG. 2, during execution of its control program, commonly represented in a ladder-diagram format, the Rack 2 processor 14' can sense the completion of a manufacturing operation and set an on/off bit to signal such a completion. The bit can then be transferred with a copy of the Rack 2 I/O status data to the inter-processor communication module 12', and from there to the supervisory processor 10. The transfer to the supervisory processor 10 is accomplished when, during its processor control program, it executes control program instructions of the type discussed in relation to FIGS. 4 and 5.

As shown in FIG. 2, the supervisory processor 10 stores a copy of the I/O image table for Rack 2 and a copy of the I/O image table for Rack 1 in its own larger data table 20. In executing instructions in the ladder-diagram language typical in the art, the supervisory processor 10 can then examine the bit in the copy of the Rack 2 I/O status data and respond by changing the state of a bit in the Rack 1 I/O status data. This bit can then be communicated in a copy of the Rack 1 I/O status data from the supervisory processor 10 to the inter-processor communication module 12, by executing program instructions of the type discussed in relation to FIGS. 4 and 5.

The inter-processor communication module 12 in Rack 1 has means 12b in the form of the serial channel controller 24 of FIG. 3 for receiving from the supervisory processor 10 the copy of I/O status data for Rack 1 that has been changed in response to the copy of the Rack 2 I/O status data that was communicated to the supervisory processor 10 from the Rack 2 processor 14'. The inter-processor communication module 12 in Rack 1 also has means 12a in the form of the backplane controller 25 of FIG. 3 that is coupled to means 12b by the common memory 26 and arbitration circuit 27 for transmitting the copy of the Rack 1 I/O status data to the Rack 1 processor 14. User communication instructions of the type discussed in relation to FIG. 4 can be included in the program of the Rack 1 processor 14 to signal the module 12 to transfer the copy of the Rack 1 I/O status data to the Rack 1 processor 14. The Rack 1 processor 14 can execute instructions in its ladder-diagram program to sense the changed bit in its data table and to begin a second manufacturing operation.

As seen in FIG. 2, this communication between the Rack 1 processor and the Rack 2 processor can also occur in the other direction. In executing its control program, the Rack 1 processor 14 can set an on/off bit in its data table when it has completed its manufacturing operation. The Rack 1 processor can then execute communication instructions to send a copy of the Rack 1 I/O status data to means 12d in the form of the backplane controller 25 operating in a receiving mode. Then, means 12c in the form of the serial channel controller 24, operating in the transmitting mode, can transmit the copy of the Rack 1 I/O status data to the supervisory processor 10. The on/off bit from Rack 1 can be sensed by the supervisory processor 10 by executing instructions in its control program. During execution of this program, another on/off bit can be set in its copy of the Rack 2 I/O status data. Later in the supervisor program, the bit can be transferred in a copy of the Rack 2 I/O status data communicated from the data table 20 in the supervisory processor 10 to a data table in the Rack 2 processor 14'. This last on/off bit can, for example, signal the Rack 2 processor to perform another cycle of its manufacturing operation. In executing further user instructions in its control program, the Rack 2 processor can look for the changed state of this bit in its data table as a signal to commence another cycle of its manufacturing operation.

This completes a description of the methods and apparatus of the invention. Of course, those skilled in the art will understand that many of the details provided herein may be modified while still carrying out the invention, and therefore, to apprise the public of the scope of the invention, the following claims are made.

Appendix A
COMPONENT APPENDIX

| Component | Ref. No. | Description |
|---|---|---|
| SIO circuit | 30 | Z80-SIO serial input/output circuit available from Zilog, Inc. |
| CTC circuit | 31 | Z80-CTC counter/timer circuit available from Zilog, Inc. |
| Microprocessor | 32 | Z80-CPU available from Zilog, Inc. |
| Z-RAM | 34 | 6116 2k × 8-bit random access memory available from Hitachi |
| EPROM | 35 | 2764 8k × 8-bit erasable programmable read-only memory available from Seeq or Hitachi |
| Chip select circuit | 36 | 74LS375 4-bit bistable latch; 74LS138 three-to-eight-line decoder; one 74LS367 non-inverting buffer; one of four SN 74LSOO quad two-input NAND gates; one of six 7404 hex inverters, all available from Texas Instruments, Inc. |
| Address buffers | 37 | Two 74LS541 octal buffers, line drivers, line receivers available from Texas Instruments, Inc. |
| Data buffers | 38 | 74ALS245 octal bus transceivers available from Texas Instruments, Inc. |
| Flip-flops | FF-1 FF-2 | 74LS74 dual D-type flip-flops available from Texas Instruments, Inc. |
| Common memory (C-RAM) | 26 | 6116 2k × 8-bit random access memory available from Seeq or Hitachi |
| Micro-Computer | 40 | 8749 8-bit microcomputer available from Intel Corp. |
| External RAM | 42 | 6116 2k × 8-bit random access memory available from Seeq or Hitachi |
| Address latch | 43 | 74LS373 octal D-type latches available from Texas Instruments, Inc. |
| Address buffers | 44 | Two 74LS541 octal buffers, line drivers, line receivers available from Texas Instruments, Inc. |
| Data buffer | 45 | 74ALS245 octal bus transceivers available from Texas Instruments, Inc. |
| Latch | 46 | 74LS374 octal D-type flip-flops available from Texas Instruments, Inc. |
| Latch | 47 | 74LS273 octal D-type flip-flops available from Texas Instruments, Inc. |
| Latch | 48 | 74AS533 octal transparent latch available from Texas Instruments, Inc. |

We claim:

1. An inter-processor communication module for insertion into an equipment rack with a plurality of I/O modules and for connection to a backplane therein for transfer of I/O data between a higher-level system processor and a local area system processor in a programmable controller system, wherein the I/O data is of the type which is converted to and from operating signals for monitoring and controlling I/O devices on a real-time machine or process, the inter-processor communication module comprising:

serial channel controller means with a serial I/O port for sending and receiving serial data messages over a serial data channel to and from the higher-level system processor, wherein the serial data messages include I/O address information which relates I/O data in the serial data messages to I/O modules in the equipment rack with the inter-processor communication module;

the serial channel controller means including means operatively connected to the serial data port and responsive to the address information in the serial data messages for inserting into, and extracting from, the serial data messages, I/O data which is related by address to the I/O modules in the equipment rack with the inter-processor communication module; and backplane controller means connected during operation to the backplane and responsive to address signals generated by the local area system processor during an I/O scan sequence for transferring the I/O data related to the I/O modules in the equipment rack through the backplane of the equipment rack to or from the local area system processor as a block of parallel data;

a common read/write memory;

arbitration circuitry coupling the serial channel controller means and the backplane controller means to the common read/write memory for alternating access to the common read/write memory; and wherein the serial channel controller means includes means for transferring the I/O data to or from the the common read/write memory as a block of I/O data;

and wherein the backplane controller means includes means for transferring the block of I/O data to or from the common read/write memory to link the serial I/O port and the backplane.

2. The inter-processor communication module of claim 1, wherein:

the serial channel controller means for communicating with the higher-level system processor includes means for receiving or transmitting, in a single serial data message with a data portion of variable length, the I/O data for the plurality of I/O modules in the equipment rack, wherein the length of the data portion of the message is determined according to the number of bytes of I/O capacity in the equipment rack; and wherein the backplane controller means is cooperable with the local area system processor for receiving or transmitting in a block transfer operation the I/O data for the rack of I/O modules, wherein the quantity of I/O data in the block is determined according to the number of bytes of I/O capacity in the equipment rack.

3. The inter-processor communication module of claim 1, wherein:

the serial channel controller means for communicating with the higher-level system processor is addressable at a rack address within an I/O addressing range of the higher-level system processor; and wherein the backplane controller means is addressable at an I/O module address within an I/O addressing range of the local area system processor.

4. The inter-processor communication module of claim 3, wherein the block of I/O data which is transferred through the backplane to the local area system processor includes all of the I/O data for the equipment rack.

5. The inter-processor communication module of claim 1, wherein:

the serial channel controller means includes means for inserting in a serial data message going to the higher-level system processor a local area processor status word with information concerning the status of communication between the backplane controller means and the backplane; and wherein the backplane controller means includes means for inserting in a block of I/O data going to the local area system processor a higher-level system processor status word with information concerning the status of communication between the serial channel controller means and the higher-level system processor.

6. One of a pair of identical inter-processor communication modules used for linking a higher-level system processor in a programmable controller system to first and second local area system processors which control industrial machines and processes, wherein the higher-level system processor is responsive to I/O data communicated from the one of the local area system processors to communicate I/O data to control the other of the local area system processors where such I/O data is interpreted by execution of a control program to control I/O devices on a controlled machine or process, the inter-processor communication module associated with the first local area processor comprising:

first means for receiving from the higher-level system processor a copy of I/O data for the first local area system processor that has been changed by the higher-level system processor in response to a copy of the I/O data communicated to the higher-level system processor from the second local area system processor;

second means, coupled to the first means, for transmitting to the first local area system processor the copy of I/O data received by the first means;

third means for receiving a copy of I/O data from the first local area system processor; and fourth means, coupled to the third means, for transmitting to the higher-level system processor the copy of I/O data received from the first local area system processor.

7. The inter-processor communication module of claim 6, wherein the first means and fourth means are coupled together for communication with one or the other of the local area system processors through a backplane of an equipment rack.

8. The inter-processor communication module of claim 6, wherein the second means and the third means are coupled together for communication with the higher-level system processor through a serial data channel.

9. The inter-processor communication module of claim 6, wherein the first means receives, and the second means transmits, in a block, the input status data associated with all input modules monitored by the first local area system processor.

10. The inter-processor communication module of claim 6, wherein the third means receives, and the fourth means transmits, in a block, the output status data associated with all output modules controlled by the local area system processor.

11. An inter-processor communication circuit for insertion into an equipment rack with a plurality of I/O modules and for transfer of I/O data between a higher-level system processor and a local area system processor in a programmable controller system, wherein the I/O data is of the type which is converted to and from operating signals for monitoring and controlling I/O devices on a real-time machine or process, the communication circuit comprising:

first controller means addressable during an I/O scan sequence by the higher-level system processor and with a serial I/O port for communicating I/O data as serial data over a serial data channel to and from the higher-level system processor in response to signals received from the higher-level system processor over the serial data channel, the first controller means storing the I/O data as a block of I/O data;

second controller means coupled to the local area system processor and responsive to signals from the local area system processor for transferring the block of I/O data as part of an I/O scanning sequence between the local area system processor and the I/O modules in the equipment rack;

wherein in said I/O scanning sequence, the local area system processor enables the I/O modules in the equipment rack in turn to communicate I/O data;

a common read/write memory and arbitration circuitry coupling the first controller means and the second controller means for alternating access to the common read/write memory; and wherein the first controller means and the second controller means communicate the block of I/O data through the common read/write memory to link the serial I/O port and the local area system processor.

12. The inter-processor circuit of claim 11, wherein:
the first controller means for communicating with the higher-level system processor includes means for receiving or transmitting, in a single serial data message with a data portion of variable length, the I/O data for the plurality of I/O modules in the equipment rack, wherein the length of the data portion of the message is determined according to the number of bytes of the I/O capacity in the equipment rack; and wherein the second controller means is cooperable with the local area system processor for receiving or transmitting a block of I/O data for the rack of I/O modules, wherein the quantity of I/O data in the block is determined according to the number of bytes of I/O capacity in the equipment rack.

13. The inter-processor communication circuit of claim 11, wherein:
the first controller means for communicating with the higher-level system processor is addressable at a rack address within an I/O addressing range of the higher-level system processor; and wherein the second controller means is cooperable with the local area system processor for receiving or transmitting the block of I/O status data in an I/O transfer sequence between the local area system processor and a plurality of I/O modules in the equipment rack.

14. The inter-processor communication circuit of claim 13, wherein the block of I/O data which is transferred through the backplane to the local area system processor includes all of the I/O data for the equipment rack.

15. The inter-processor communication circuit module of claim 11, wherein:
the first controller means includes means for inserting in a serial data message going to the higher-level system processor a local area processor status word with information concerning the status of communication with the local area system processor; and wherein the second controller means includes means for inserting in a block of I/O data going to the local area system processor a higher-level system processor status word with information concerning the status of communication between the first controller means and the higher-level system processor.

16. A method by which I/O data is acquired by a higher-level system processor from a local area system processor, and is distributed from the higher-level system processor to the local area system processor in a programmable controller system, wherein the local area system processor is of the type for executing an I/O scan operation in which I/O modules in an equipment rack with the local area system processor are enabled in turn to transfer I/O data, and wherein the I/O data is of the type which is converted to and from operating signals for monitoring and controlling I/O devices on a real-time system or process, the method comprising:

placing a module with an inter-processor communication circuit in a slot in a respective equipment rack having a rack backplane;

connecting the inter-processor communication circuit for communication through the rack backplane to a local area system processor;

connecting the inter-processor communication circuit for communication through a serial data link to a higher-level system processor;

the inter-processor communication circuit communicating directly with the higher-level system processor by responding directly to a rack address from a higher-level system processor, without the rack address being communicated through the local area system processor;

transferring a group of I/O data for one or more I/O modules in the equipment rack as serial data through the serial data link between the higher-level system processor and the inter-processor communication circuit;

storing as a block of I/O data in the inter-processor communication circuit the group of I/O data transmitted through the serial data link; and initiating and controlling from the local area system processor the transfer of the block of I/O data between the local area system processor and the inter-processor communication circuit during an I/O scanning operation in which the local area system processor enables a plurality of I/O modules in the equipment rack in turn to communicate I/O data.

17. The method of claim 16, wherein the group of I/O data transferred through the serial data link is a single serial data message containing the I/O data for a rack of I/O modules.

18. The method of claim 16, wherein the group of I/O data transferred through the serial data link is a single serial data message containing a block of I/O data associated with an address of an individual I/O module.

19. The method of claim 16, further comprising the step of:

inserting in a serial data message being transferred through the serial data channel a local area processor status word with information concerning the status of communication with the local area system processor; and further comprising the step of inserting in a block of I/O data being transferred to the local area system processor a supervisory processor status word with information concerning the status of communication with the higher-level system processor.

20. One of a pair of inter-processor communication circuits used for linking a higher-level system processor to first and second local area system processors which control industrial machines and processes in a programmable controller system, wherein the higher-level system processor is responsive to I/O data communicated from the one of the local area system processors to communicate I/O data to control the other of the local area system processors where such I/O data is interpreted by execution of a control program to control I/O devices on a controlled machine or process, the inter-processor communication module associated with the first local area system processor comprising:

first means for receiving from the higher-level system processor a copy of I/O data for the first local area system processor that has been changed by the higher-level system processor in response to a copy of the I/O data communicated to the higher-level system processor from the second local area system processor;

second means, coupled to the first means, for transmitting to the first local area system processor the copy of I/O data received by the first means;

third means for receiving a copy of I/O data from the first local area system processor; and fourth means, coupled to the third means, for transmitting to the higher-level system processor the copy of I/O data received from the first local area system processor.

21. The inter-processor communication circuit of claim 20, wherein the first means and fourth means are coupled together for communication with one or the other of the local area system processors.

22. The inter-processor communication circuit of claim 20, wherein the second means and the third means are coupled together for communication with the higher-level system processor through a serial data channel.

23. The inter-processor communication module of claim 20, wherein the first means receives, and the second means transmits, in a block, the input status data associated with all input modules monitored by the first local area system processor.

24. The inter-processor communication module of claim 20, wherein the third means receives, and the fourth means transmits, in a block, the output status data associated with all output modules controlled by the local area system processor.

* * * * *